US008909668B2

(12) United States Patent
Miyata et al.

(10) Patent No.: US 8,909,668 B2
(45) Date of Patent: Dec. 9, 2014

(54) METHOD OF DISTRIBUTING CONTENTS AND SYSTEM

(75) Inventors: Michitaro Miyata, Tokyo (JP); Junichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 1035 days.

(21) Appl. No.: 12/510,430

(22) Filed: Jul. 28, 2009

(65) Prior Publication Data

US 2010/0023489 A1    Jan. 28, 2010

(30) Foreign Application Priority Data

Jul. 28, 2008   (JP) ................................ 2008-193778

(51) Int. Cl.
    *G06F 17/30*   (2006.01)
(52) U.S. Cl.
    CPC ..................... *G06F 17/30* (2013.01)
    USPC ......................................................... 707/770
(58) Field of Classification Search
    USPC ......................................................... 707/770
    See application file for complete search history.

(56) References Cited

FOREIGN PATENT DOCUMENTS

| JP | 2000224257 A | 8/2000 |
|----|--------------|--------|
| JP | 2001101190 A | 4/2001 |
| JP | 2001256192 A | 9/2001 |
| JP | 2005080209 A | 3/2005 |
| JP | 2005524108 A | 8/2005 |
| JP | 2005274992 A | 10/2005 |
| JP | 2006148373 A | 6/2006 |
| JP | 2006525537 A | 11/2006 |
| JP | 2006338298 A | 12/2006 |
| JP | 2007013877 A | 1/2007 |
| JP | 2007193827 A | 8/2007 |
| JP | 2008033943 A | 2/2008 |

OTHER PUBLICATIONS

Incentives build robustness in BitTorrent, B. Cohen—Workshop on Economics of Peer-to-Peer systems, 2003.*
Modeling and performance analysis of BitTorrent-like peer-to-peer networks, D. Qiu, ACM SIGCOMM Computer Communication, 2004.*
The bittorrent p2p file-sharing system: Measurements and analysis, J Pouwelse, P. Garbacki, D Epema, Peer-to-Peer Systems IV, 2005.*
Analyzing and improving a bittorrent network's performance mechanisms, AR Bharambe, C Herley, IEEE INFOCOMM, 2006.*
J. Haitsma et al., "A Highly Robust Audio Fingerprinting System", ISMIR 2002 3rd International Conference on Music Information Retrieval.

* cited by examiner

*Primary Examiner* — Ajay Bhatia
*Assistant Examiner* — Kurt Mueller
(74) *Attorney, Agent, or Firm* — Sughrue Mion, PLLC

(57) ABSTRACT

A method of distributing contents including steps of: calculating feature quantities of contents written in a plurality of files by using a common calculation operation; allotting a common ID to feature quantities which are equivalent to each other among the calculated feature quantities; associating the plurality of files with the IDs corresponding to said files, and storing the associated files and IDs into a node of a network; gathering, when obtaining the stored file from the node, information on ID of said file and said node through the network; requesting the node shown in the gathered information to transmit the file corresponding to the ID shown in said information; and transmitting the requested file from the node.

7 Claims, 40 Drawing Sheets

FIGURE 8

| ID COLUMN | PEER INFORMATION COLUMN |
|---|---|
| | |
| | |
| | |
| | |

3521 — ID COLUMN
3522 — PEER INFORMATION COLUMN

352 PEER INFORMATION MANAGEMENT AREA

FIGURE 9

| METADATA COLUMN | ID COLUMN | FILE POINTER COLUMN |
|---|---|---|
| | | |
| | | |
| | | |
| | | |

3531 — METADATA COLUMN
3532 — ID COLUMN
3533 — FILE POINTER COLUMN

353 RETAINED FILE MANAGEMENT AREA

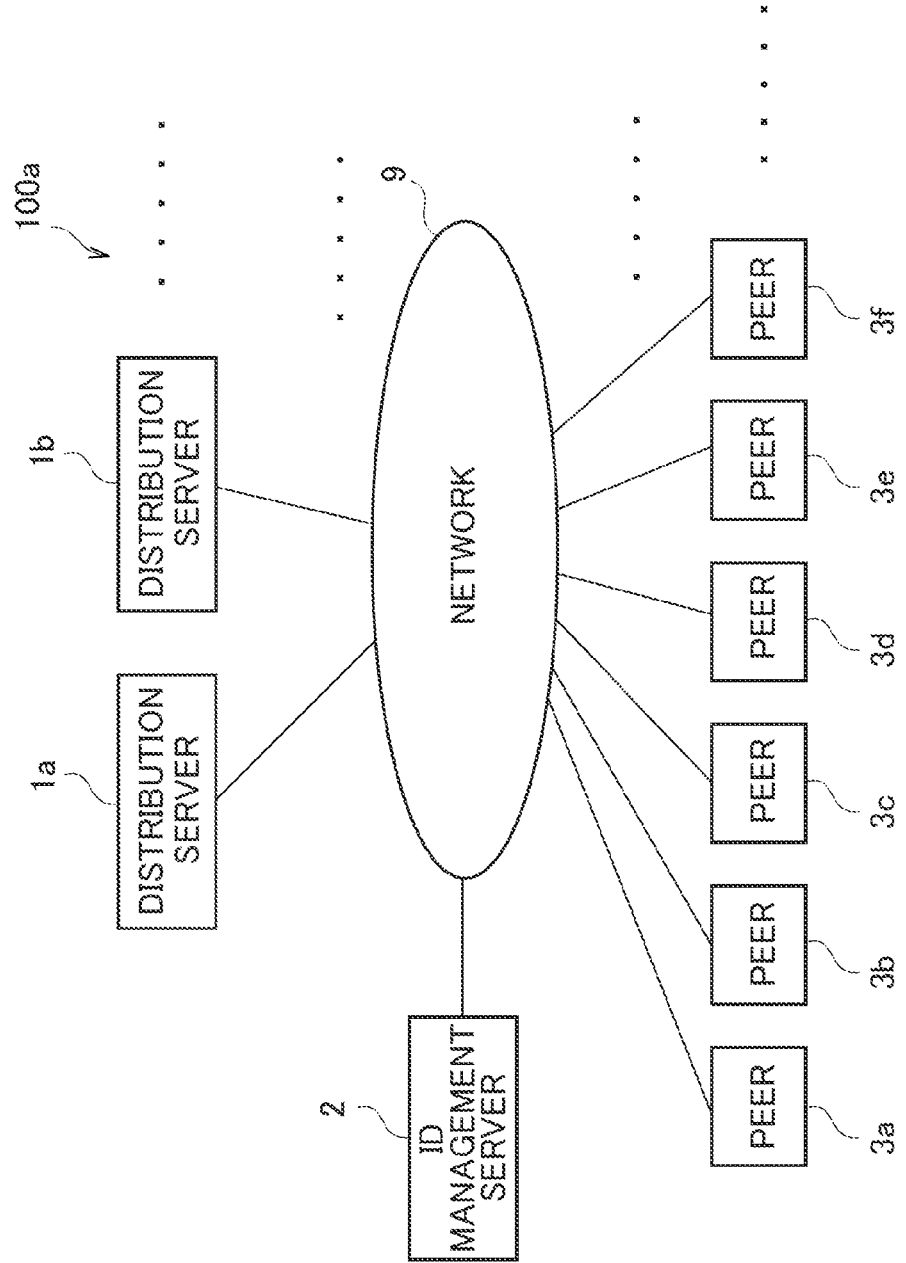

FIGURE 21

RETAINED FILE MANAGEMENT AREA

STATE (A)

153a:

| METADATA COLUMN | ID COLUMN | FILE POINTER COLUMN |
|---|---|---|
| FILE TYPE = VIDEO<br>TITLE = YY<br>FORMAT = FORMAT A | (NULL) | (POINTER TO FILE A) |
| (NULL) | (NULL) | (NULL) |

153b:

| METADATA COLUMN | ID COLUMN | FILE POINTER COLUMN |
|---|---|---|
| FILE TYPE = VIDEO<br>TITLE = ZZ<br>FORMAT = FORMAT B | (NULL) | (POINTER TO FILE B) |
| (NULL) | (NULL) | (NULL) |

STATE (B)

153a:

| METADATA COLUMN | ID COLUMN | FILE POINTER COLUMN |
|---|---|---|
| FILE TYPE = VIDEO<br>TITLE = YY<br>FORMAT = FORMAT A | 10 | (POINTER TO FILE A) |
| (NULL) | (NULL) | (NULL) |

153b:

| METADATA COLUMN | ID COLUMN | FILE POINTER COLUMN |
|---|---|---|
| FILE TYPE = VIDEO<br>TITLE = ZZ<br>FORMAT = FORMAT B | (NULL) | (POINTER TO FILE B) |
| (NULL) | (NULL) | (NULL) |

STATE (C)

153a:

| METADATA COLUMN | ID COLUMN | FILE POINTER COLUMN |
|---|---|---|
| FILE TYPE = VIDEO<br>TITLE = YY<br>FORMAT = FORMAT A | 10 | (POINTER TO FILE A) |
| (NULL) | (NULL) | (NULL) |

153b:

| METADATA COLUMN | ID COLUMN | FILE POINTER COLUMN |
|---|---|---|
| FILE TYPE = VIDEO<br>TITLE = ZZ<br>FORMAT = FORMAT B | 10 | (POINTER TO FILE B) |
| (NULL) | (NULL) | (NULL) |

FIGURE 22
FILE STORAGE AREA
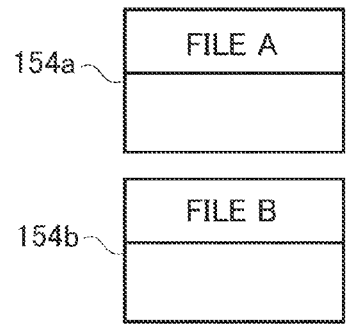
FIGURE 23
PRIMARY DISTRIBUTION PEER MANAGEMENT AREA
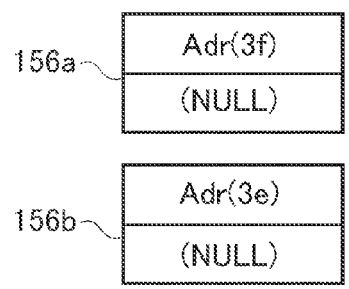
FIGURE 24
FEATURE QUANTITY MANAGEMENT INFORMATION AREA
STATE (A)
| | FEATURE QUANTITY COLUMN | ID COLUMN |
|---|---|---|
| 255 | (NULL) | (NULL) |
↓
STATE (B)
| | FEATURE QUANTITY COLUMN | ID COLUMN |
|---|---|---|
| 255 | FEATURE QUANTITY (X) | 10 |
| | (NULL) | (NULL) |

FIGURE 27
CONNECTED PEER
MANAGEMENT AREA
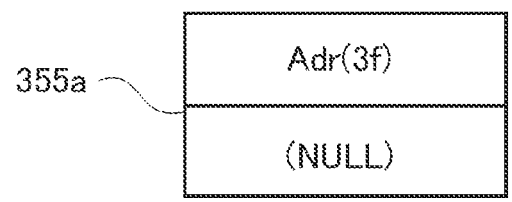
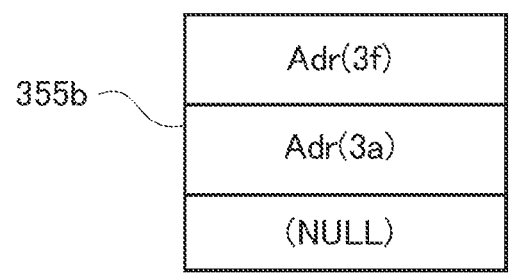
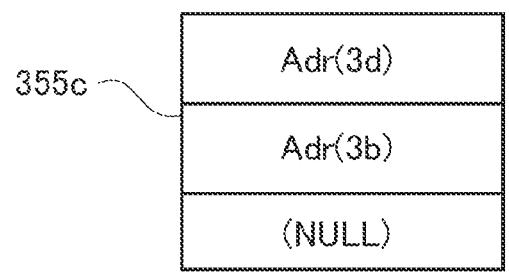
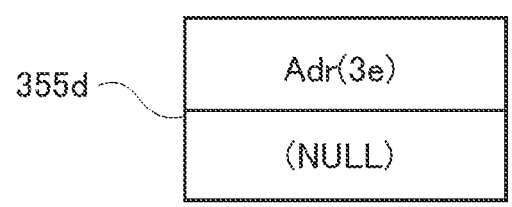
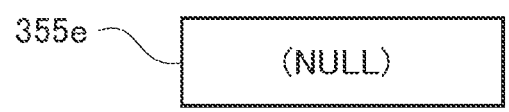

255 FEATURE QUANTITY MANAGEMENT INFORMATION AREA

352 PEER INFORMATION MANAGEMENT AREA

METHOD OF DISTRIBUTING CONTENTS AND SYSTEM

This application is based upon and claims priority to Japanese Patent Application No. 2008-193778, filed on Jul. 28, 2008, the contents of which are incorporated herein by reference.

TECHNICAL FIELD

The present invention relates to a technique for distributing contents such as videos and music via a communication network.

BACKGROUND ART

Contents indicates data such as video data and music data that is stored in electronic files. Examples of contents distribution forms include the client-server type and the "peer to peer" type (hereinafter referred to as "P2P"). In a client-server type system, a request for contents is issued from a client to a server that distributes contents, and a file storing the contents is delivered from the server to the client.

In a P2P system, on the other hand, each of node devices called peers connected to a network serves as both a client and a server. In a contents distribution system of the P2P type, contents requesting peers exchange files directly with peers that hold files including the contents.

When contents is downloaded in a P2P distribution system, the target file is identified with the use of the metadata describing the file name or title of the contents or the identifier of the file. The target file is then downloaded from a peer that holds the file.

An example of a technique involving contents is disclosed in Patent Literature 1 which will described later. This literature discloses a technique for determining whether retrieved media contents correspond to the identifier designated by a user with respect to desired contents.

CITATION LIST

Patent Literature

{PTL 1} Japanese Patent Application Laid-Open No. 2008-033943
{PTL 2} Japanese Patent Application National Publication (Laid-Open) No. 2005-524108

Non Patent Literature

{NPL 1} "A Highly Robust Audio Fingerprinting System" by Jaap Haitsma and Ton Kalker, ISMIR 2002 3rd International Conference on Music Information Retrieval

SUMMARY OF INVENTION

Technical Problem

The person who sets metadata or an identifier in a contents file is the manager of a peer that holds the file or the like. Therefore, in a case where there are two or more peers holding the same contents, there might be two or more file identifiers with respect to the contents. Also, there are several types of formats and codecs to be used for creating video or audio contents. Therefore, there might be two or more identifiers existing for the contents in this case.

According to the technique disclosed in Patent Literature 1, the similarity between the identifier designated by a user and the retrieved contents is examined. To do so, the contents need to be downloaded. However, in a case where there are two or more identifiers existing for the same contents, it is difficult for the user to determine which identifier should be designated for the downloading.

In some other case, a peer having desired contents cannot be found in the network even by designating an identifier and searching for the contents based on the identifier. In such a case, the user determines that the contents cannot be retrieved, but the truth might be that the contents are associated with another identifier. As a result, the user loses the chance to retrieve the desired contents.

A specific example case that involves the above problem is now described. In a system in this example case, a distributor A distributes video contents C in a file defined as "format: X, title: x, file identifier: xx", and another distributor B distributes the video contents C in a file defined as "format: Y, title: y, file identifier: yy". Here, "title: x" is the title of the contents C in Japanese, and "title: y" is the title of the contents C in English.

Here is a requester who wishes to view the contents C, regardless of its format. This requester only has "title: x" in Japanese as the information on the contents C. The requester designates "title: x" and searches for the corresponding title in the system. As a result, the requester obtains "file identifier: xx". If the peer of the distributor A managing the contents C with "file identifier: xx" cannot be accessed, the requester cannot download the contents C.

Meanwhile, there is the distributor B managing the contents C with "title: y" and "file identifier: yy" in the same system. However, the requester, who has only "title: x" as the information on the contents C, cannot realize that not only the distributor A but also the distributor B has the contents C. Therefore, the distributor of the contents C for this requester is limited to the distributor A.

An object of the present invention is to provide a technique for increasing the possibility of successful contents retrieval in a contents distribution system.

Solution to Problem

A method of distributing contents according to the present invention includes steps of: calculating feature quantities of contents written in a plurality of files by using a common calculation operation; allotting a common ID to feature quantities which are equivalent to each other among the calculated feature quantities; associating the plurality of files with the IDs corresponding to said files, and storing the associated files and IDs into a node of a network; gathering, when obtaining the stored file from the node, information on ID of said file and said node through the network; requesting the node shown in the gathered information to transmit the file corresponding to the ID shown in said information; and transmitting the requested file from the node.

A system according to the present invention includes: a distribution server; an ID server; and a plurality of peers connected to a network, wherein the distribution server has a unit calculating feature quantities of contents written in a plurality of files by using a common calculation operation and notifying the ID server of the calculated feature quantities, and a unit implementing a primary distribution by transmitting the plurality of files along with their respective IDs to the peers, the ID server has a unit allotting a common ID to feature quantities which are equivalent to each other among the notified feature quantities from the distribution server, and a unit notifying the distribution server of the allotted ID, and each of the plurality of peers has: a unit associating the plurality of files with the IDs transmitted by the primary distribution and storing the associated files and IDs; a unit gathering, when obtaining the file stored in another peer, information on ID of said file and said another peer through the network; a unit transferring a request from another peer related to the gathering of the information; a unit requesting the another peer shown in the gathered information to transmit the file corresponding to the ID shown in said information; and a unit transmitting the stored file to another peer when said file is requested by said another peer.

Advantageous Effects of Invention

According to the present invention, the possibility of successful contents retrieval in a contents distribution system can be made higher.

BRIEF DESCRIPTION OF DRAWINGS

FIG. 8 A diagram shows the data structure of a peer information management area in the first embodiment of the present invention;

FIG. 9 A diagram shows the data structure of a retained file management area in the first embodiment of the present invention;

FIG. 20 A block diagram shows the structure of an entire system as a specific example of the first embodiment of the present invention;

FIG. 21 A diagram shows the data structure of a retained file management area in the specific example of the first embodiment of the present invention;

FIG. 22 A diagram shows the data structure of a file storage area in the specific example of the first embodiment of the present invention;

FIG. 23 A diagram shows the data structure of a primary distribution peer management area in the specific example of the first embodiment of the present invention;

FIG. 24 A diagram shows the data structure of a feature quantity management information area in the specific example of the first embodiment of the present invention;

FIG. 27 A diagram shows the data structure of a connected peer management information area in the specific example of the first embodiment of the present invention;

DESCRIPTION OF EMBODIMENTS

First Embodiment

Figure 1:
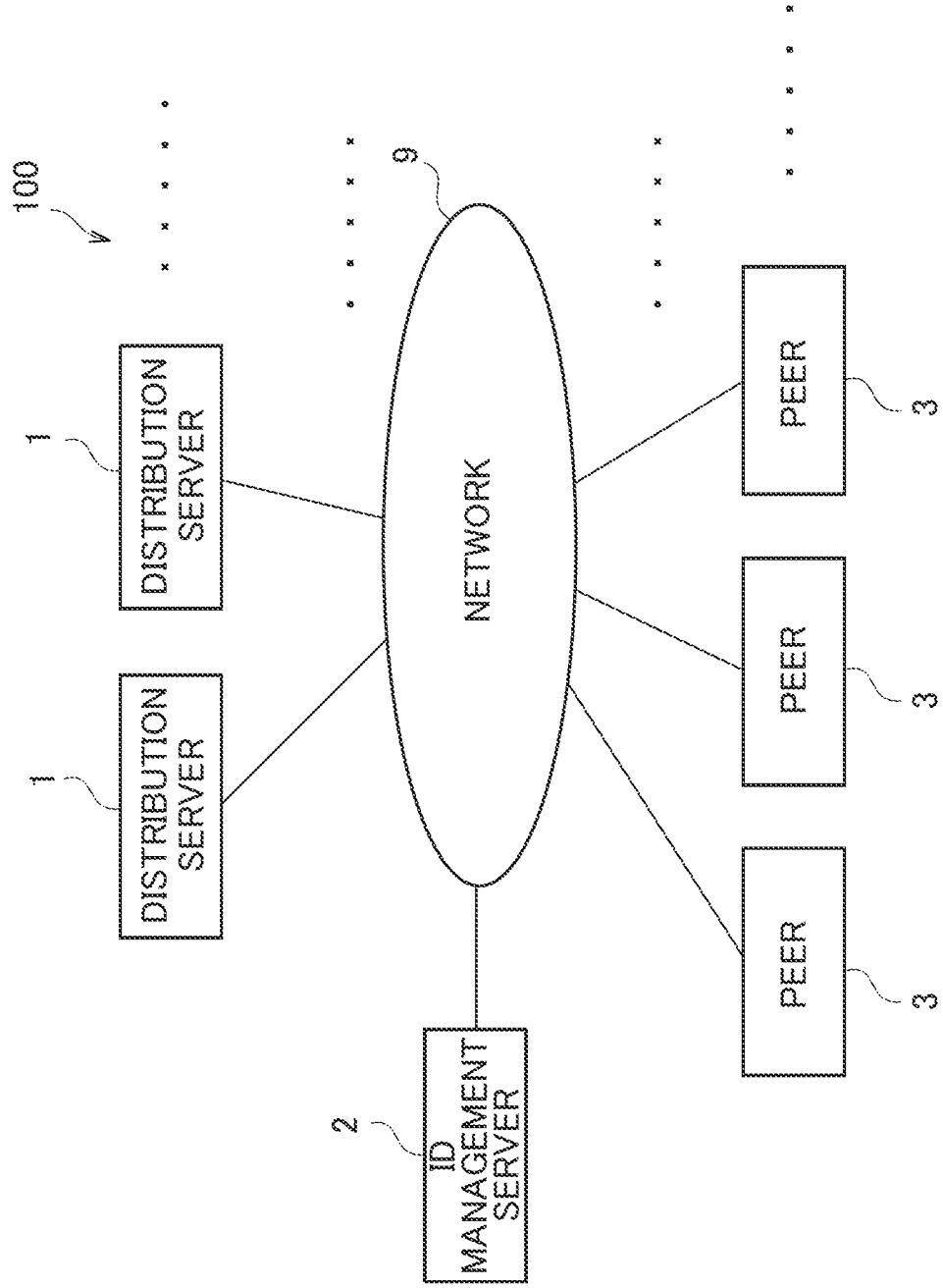
FIG. 1 A block diagram shows the system structure of each embodiment of the present invention.

FIG. 1 illustrates a system structure of a first embodiment of the present invention. The system 100 includes distribution servers 1, an ID management server 2, and peers 3. These are nodes of a network 9.

The distribution servers 1 each add metadata and identifiers to contents files to be distributed to the peers 3, and then start distributing the metadata. The ID management server 2 manages the identifiers (hereinafter referred to as the "IDs") of the contents. Each of the peers 3 requests the other peers 3 to transmit files, and also transmits files in response to requests from the other peers 3. The peers 3 search for files and peer information among them. The network 9 provides communication paths among the distribution servers 1, the ID management server 2, and the peers 3.

Figure 2:
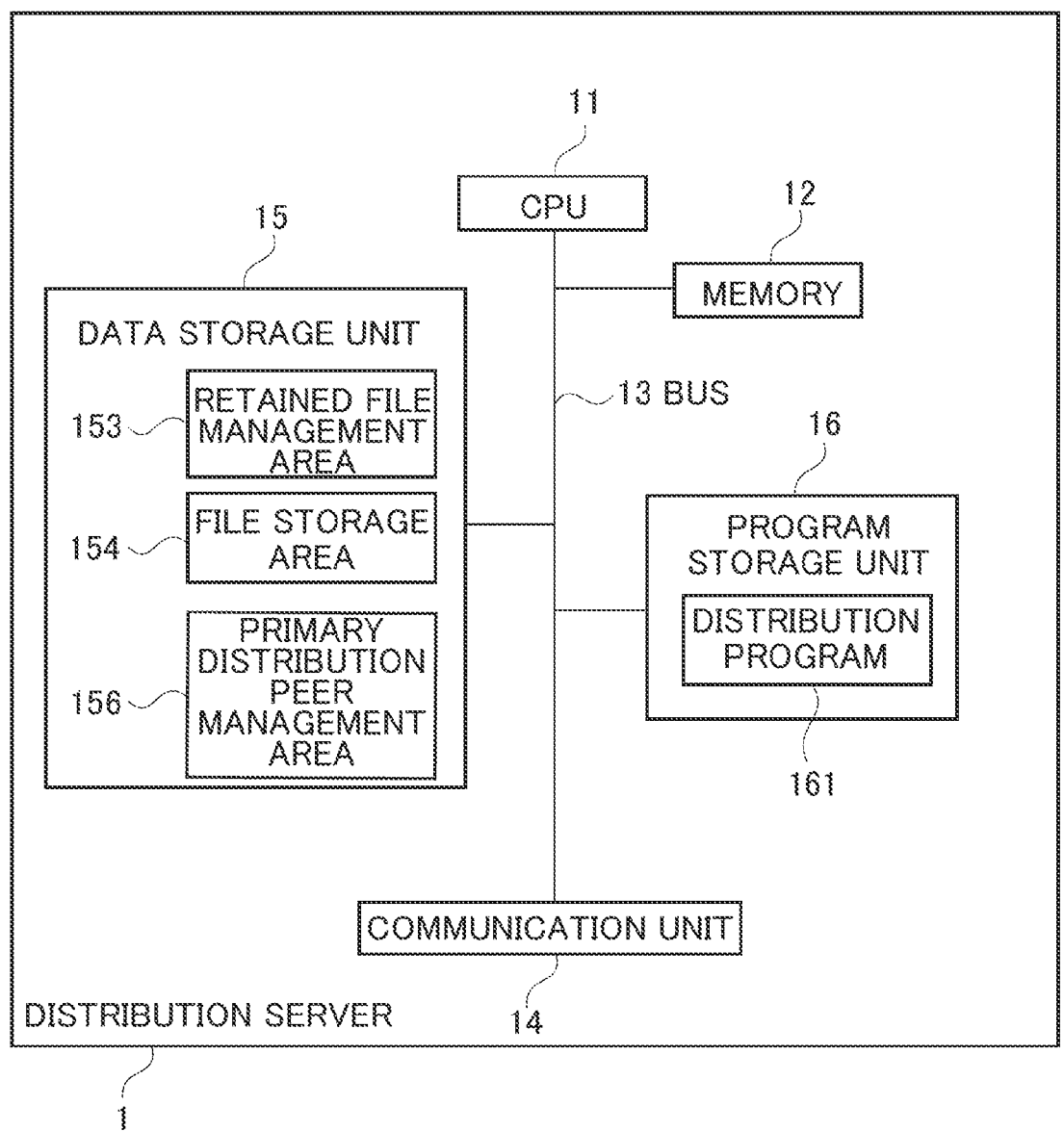
FIG. 2 A block diagram shows the structure of each distribution server in each embodiment of the present invention.
Figure 5:
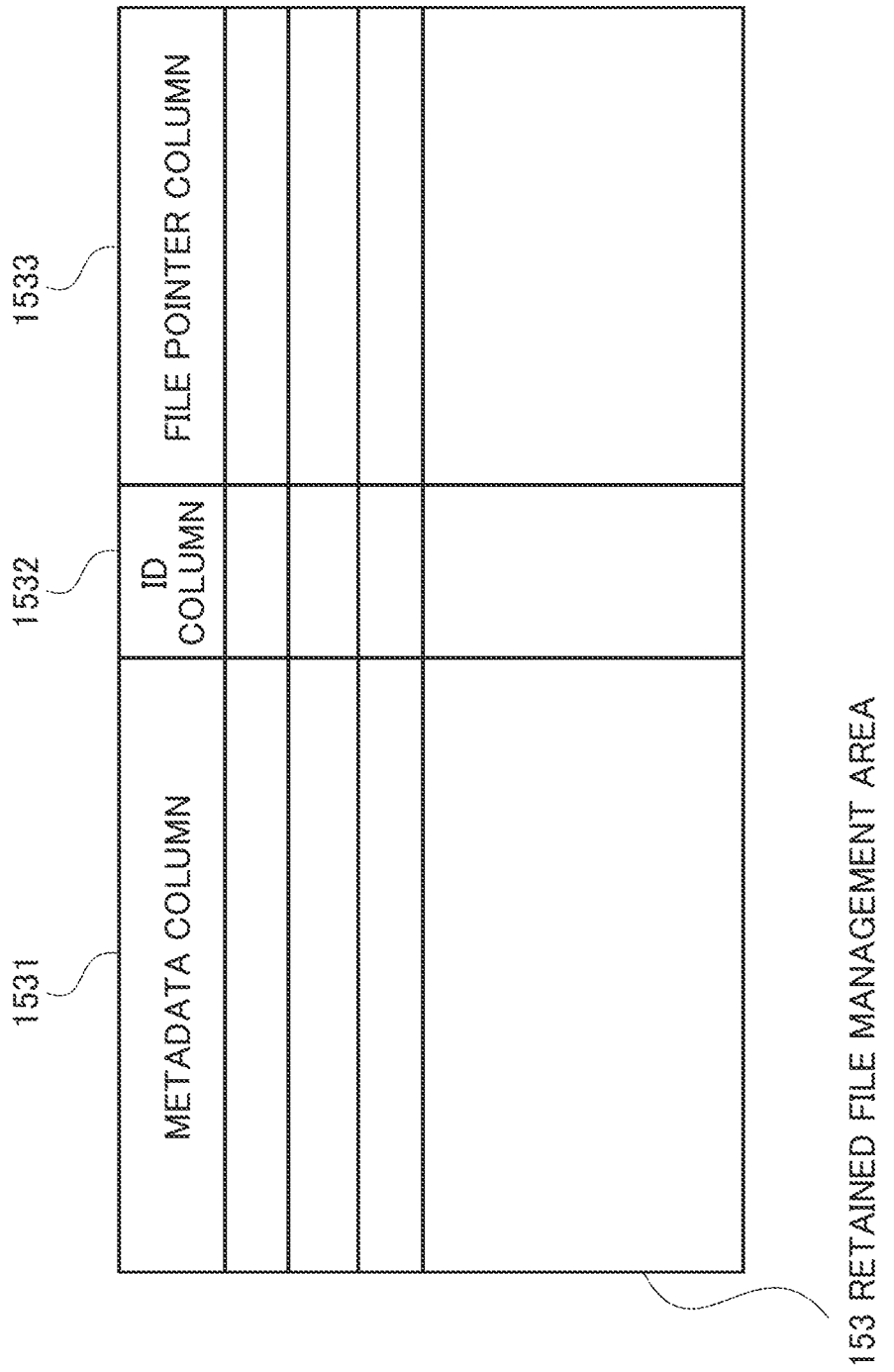
FIG. 5 A diagram shows the data structure of a retained file management area in a first embodiment of the present invention.

Referring now to FIGS. 2 and 5, the structure of each of the distribution servers 1 is described in detail. Each distribution server 1 includes a CPU 11, a memory 12, a bus 13, a communication unit 14, a data storage unit 15, and a program storage unit 16. The CPU 11 is a central processing unit that executes programs. The memory 12 is a memory device that provides a memory space for each program to operate, and may be a DRAM (Dynamic Random Access Memory), for example. The bus 13 is a data path inside the distribution server 1, and connects the CPU 11, the memory 12, the communication unit 14, the data storage unit 15, and the program storage unit 16. The communication unit 14 is an interface between the inside of the distribution server 1 and the network 9.

The data storage unit 15 is a memory device that has a memory space for storing data, and may be a hard disk drive (hereinafter referred to as "HDD"), for example. The data storage unit 15 includes a retained file management area 153, a file storage area 154, and a primary distribution peer management area 156. The retained file management area 153 stores the information to be used for managing retained files. The file storage area 154 stores files. The primary distribution peer management area 156 stores the information on the peers 3 to which contents is to be distributed. An operation to distribute contents from the distribution server 1 to a designated the peers 3 is a primary distribution.

FIG. 5 shows the data structure in the retained file management area 153. The retained file management area 153 is a table that is formed with a metadata column 1531, an ID column 1532, and a file pointer column 1533.

The metadata describing file attributes is stored in the metadata column 1531. In the metadata, the attributes and their values are associated and written in accordance with the table format or XML (Extensible Markup Language), for example. Examples of the attributes include the names of files, and the dates and times of file creation. In a case where the contents is music, the attributes may include the names of tunes and the names of musicians, for example. In a case where the contents is videos, the attributes may include the titles of the videos and the information on the casts.

The IDs that are determined by the ID management servers 2 and are the information for identifying contents are stored in the ID column 1532. File pointers each pointing out one of the files stored in the file storage area 154 are stored in the file pointer column 1533.

The program storage unit 16 is a memory device that has a memory space for storing programs, and may be a HDD, for example. The program storage unit 16 and the data storage unit 15 may be physically the same memory device having different memory spaces allocated to the respective storage units 15 and 16. The program storage unit 16 stores a distribution program 161. The distribution program 161 is a program that describes the operation to start distributing contents.

Figure 43:
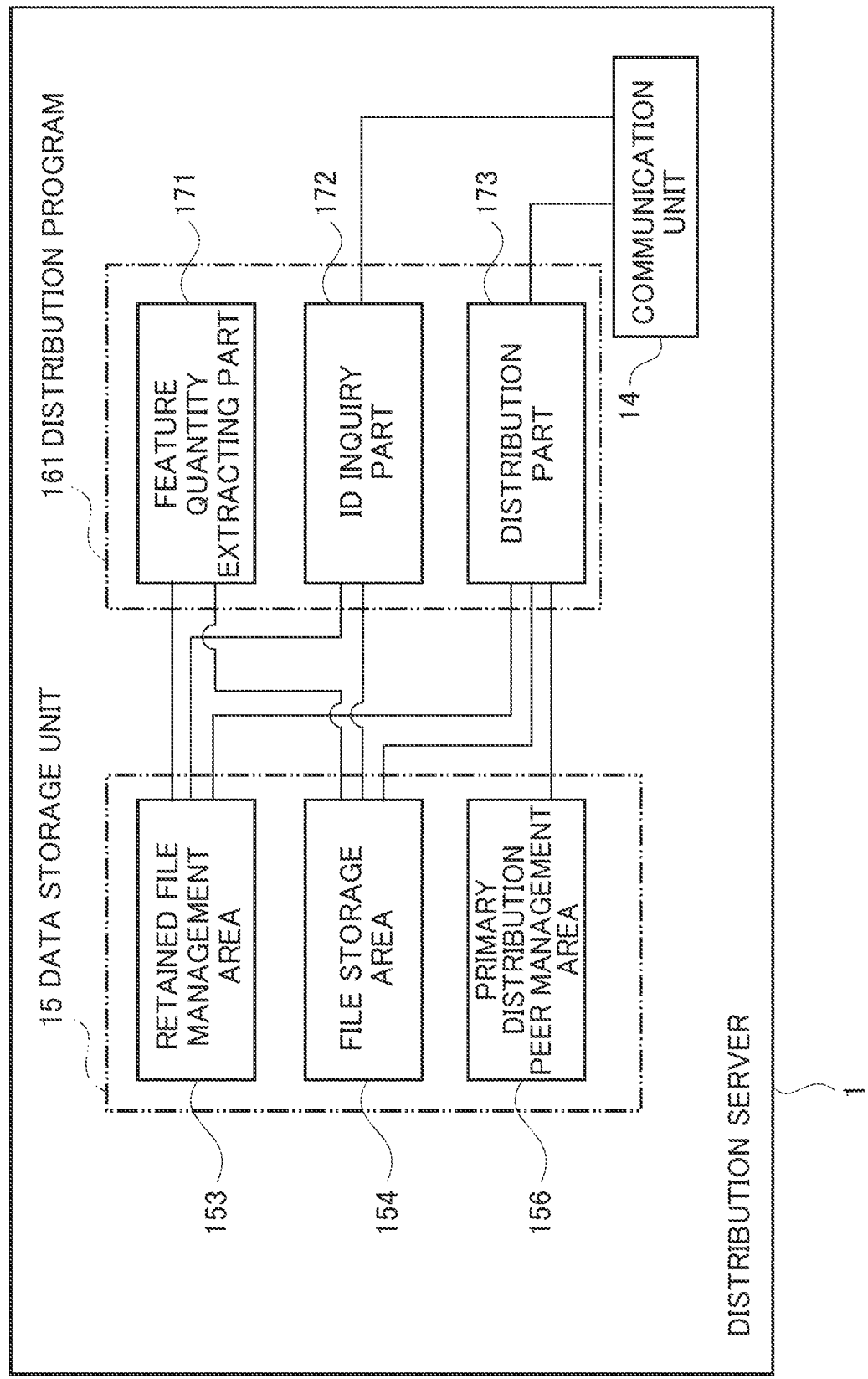
FIG. 43 A block diagram of each distribution program in each embodiment of the present invention.

FIG. 43 schematically shows the functional structure of the distribution program 161 in each distribution server 1. Between the distribution program 161 and the data storage unit 15, a feature quantity extracting part 171 accesses the retained file management area 153 and the file storage area 154. An ID inquiring part 172 accesses the retained file management area 153 and the file storage area 154. A distribution part 173 accesses the retained file management area 153, the file storage area 154, and the primary distribution peer management area 156. The functions of those parts will be described later in detail.

Figure 3:
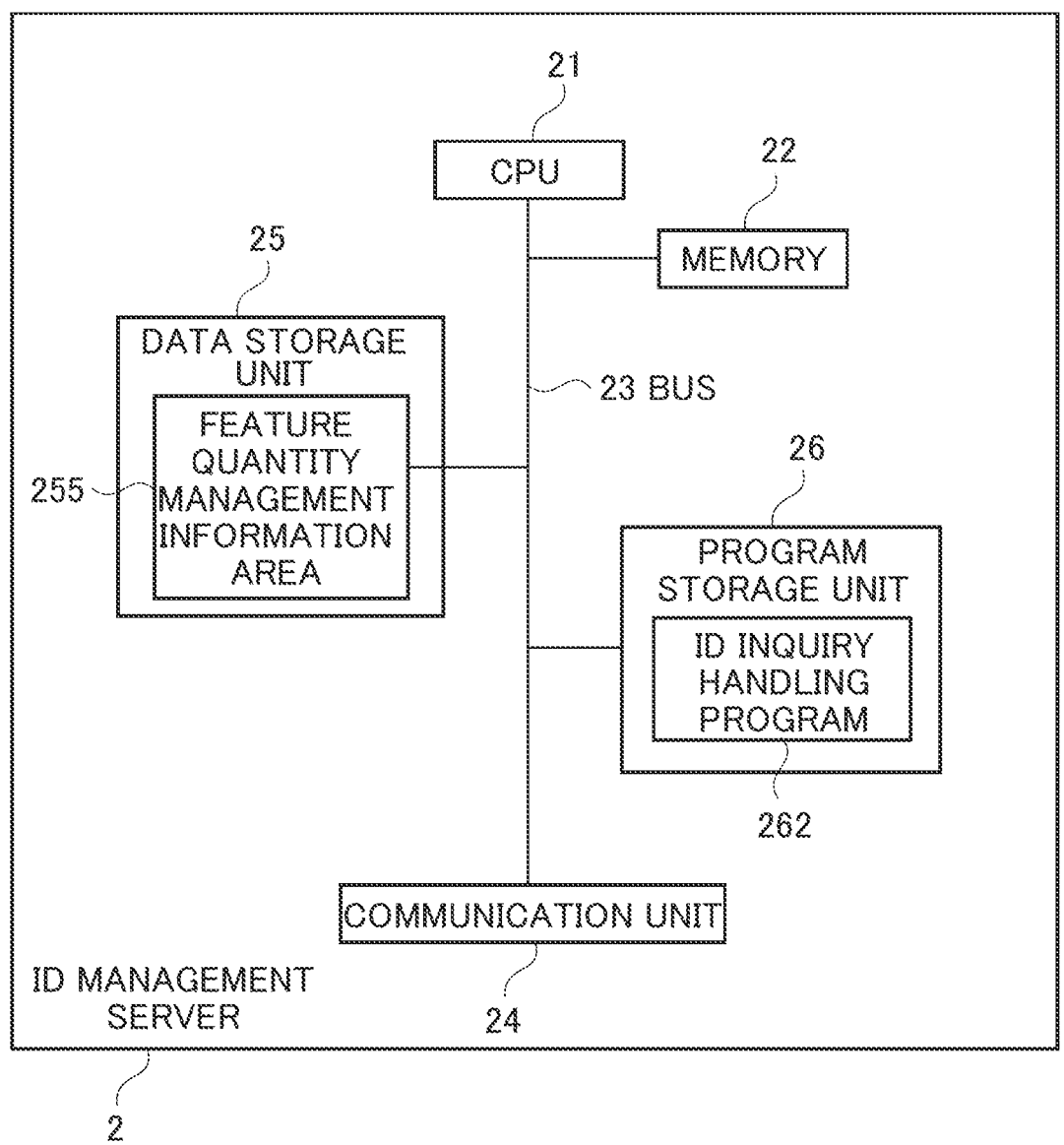
FIG. 3 A block diagram shows the structure of the ID management server in each embodiment of the present invention.
Figure 4:
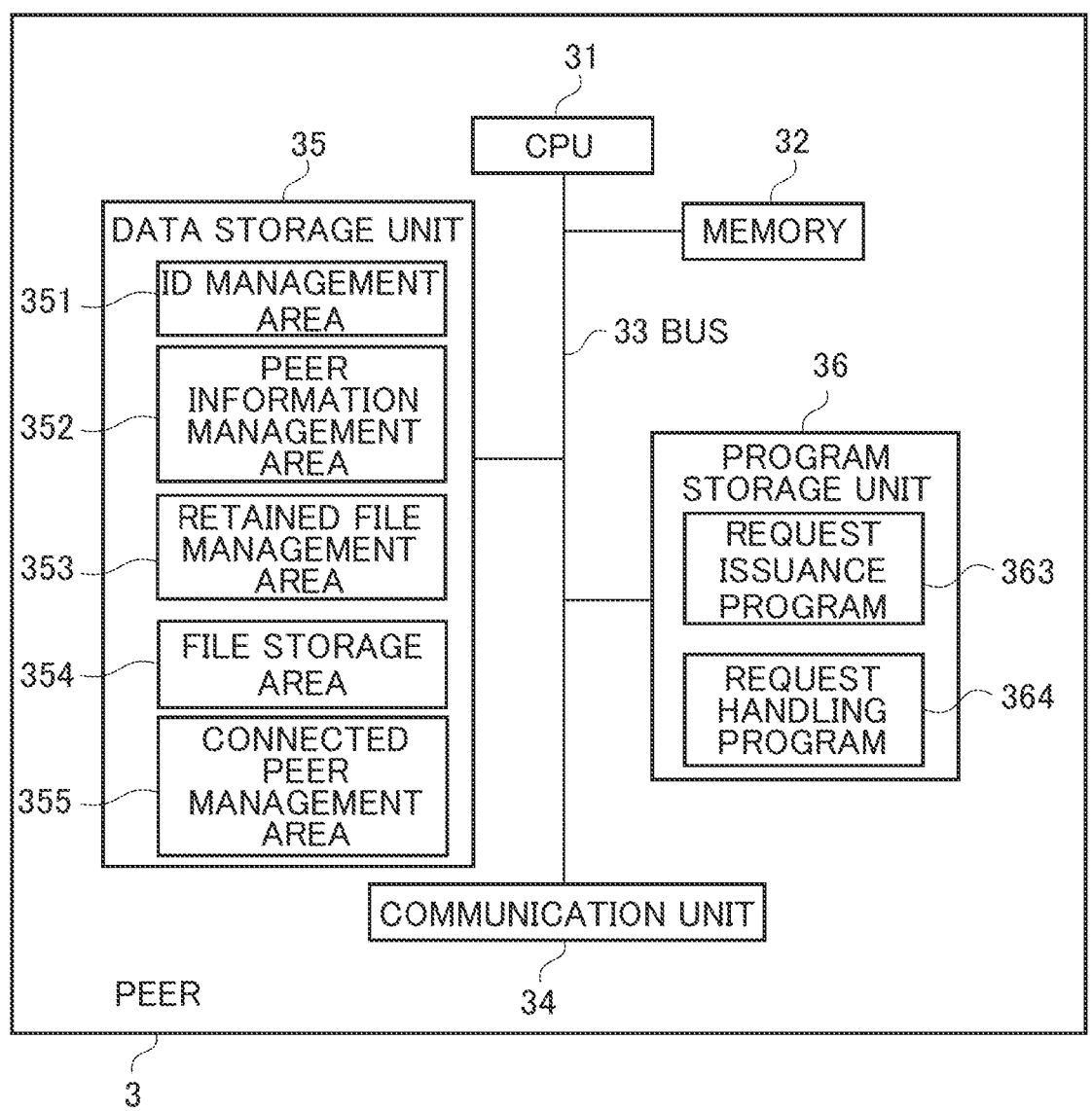
FIG. 4 A block diagram shows the structure of each peer in each embodiment of the present invention.
Figure 6:
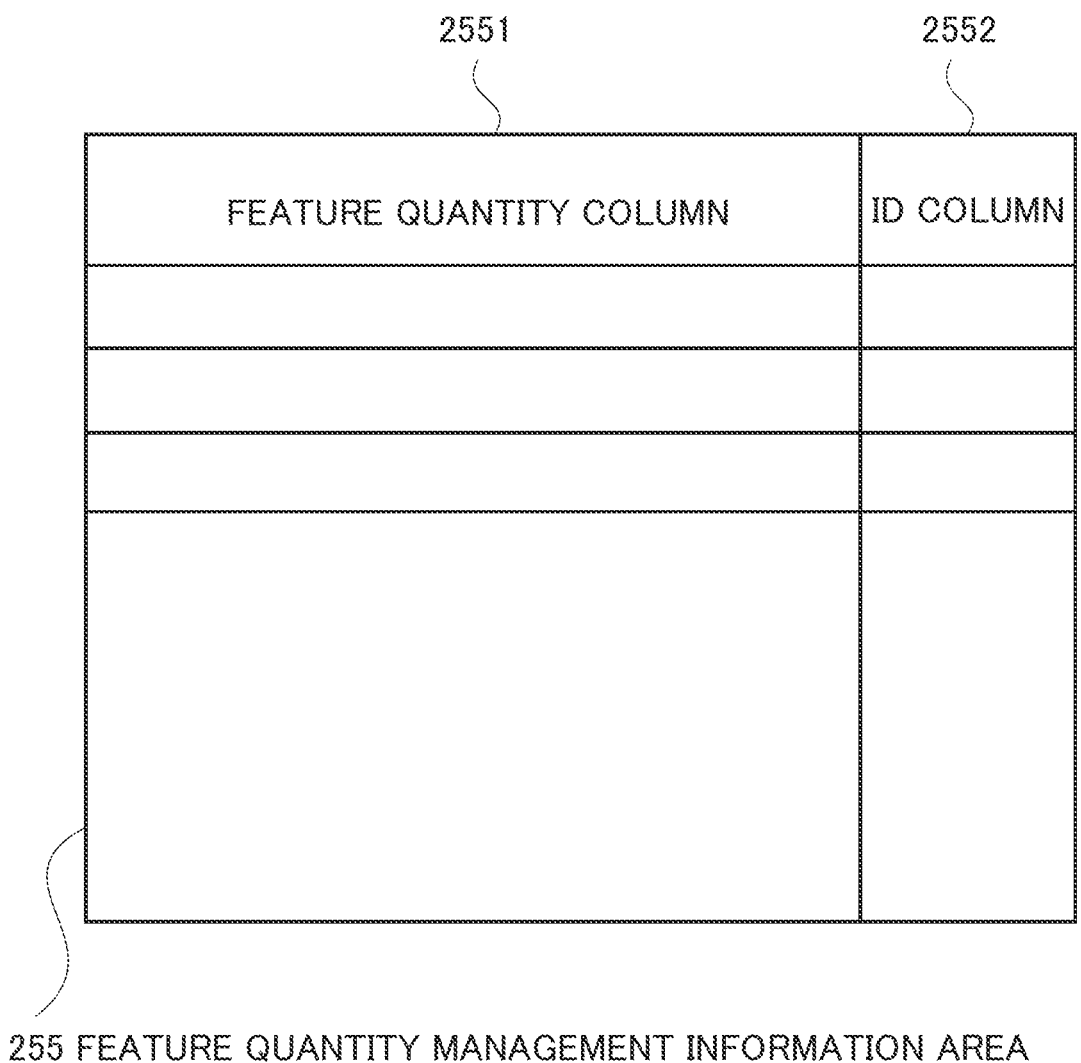
FIG. 6 A diagram shows the data structure of a feature quantity management information area in the first embodiment of the present invention.

Referring now to FIGS. 3 and 6, the structure of the ID management server 2 is described in detail. The ID management server 2 includes a CPU 21, a memory 22, a bus 23, a communication unit 24, a data storage unit 25, and a program storage unit 26.

The CPU 21 is a central processing unit that executes programs. The memory 22 is a memory device that provides a memory space for each program to operate, and may be a DRAM, for example. The bus 23 is a data path inside the ID management server 2, and connects the CPU 21, the memory 22, the communication unit 24, the data storage unit 25, and the program storage unit 26. The communication unit 24 is an interface between the inside of the ID management server 2 and the network 9. The data storage unit 25 is a memory device that has a memory space for storing data, and may be a HDD, for example. The data storage unit 25 includes a feature quantity management information area 255.

FIG. 6 shows the data structure in the feature quantity management information area 255. The feature quantity management information area 255 is a table that is formed with a feature quantity column 2551 and an ID column 2552. The feature quantities of contents are stored in the feature quantity column 2551, and the IDs are stored in the ID column 2552.

The feature quantities of contents are the information to be used for uniquely identifying the contents, regardless of the format of the contents file or the type of a codec or the like. More specifically, fingerprinting is known as a technique for identifying audio or visual contents, for example. The fingerprinting is disclosed in Non Patent Literature 1, for example. Patent Literature 2 discloses a method for extracting fingerprints of audio data. In a system that handles contents having electronic watermark embedded therein in advance, electronic watermark extracted from contents may be used as the feature quantity. Also, data that is formed by combining a fingerprint or electronic watermark with a replay time or the like may be used as the feature quantity.

The program storage unit 26 is a memory device that has a memory space for storing programs, and may be a HDD, for example. The program storage unit 26 and the data storage unit 25 may be physically the same memory device having different memory spaces allocated to the respective storage units 25 and 26. The program storage unit 26 stores an ID inquiry handling program 262. The ID inquiry handling program 262 is a program that describes the operation to be performed when an ID inquiry is received from the distribution server 1.

Figure 44:
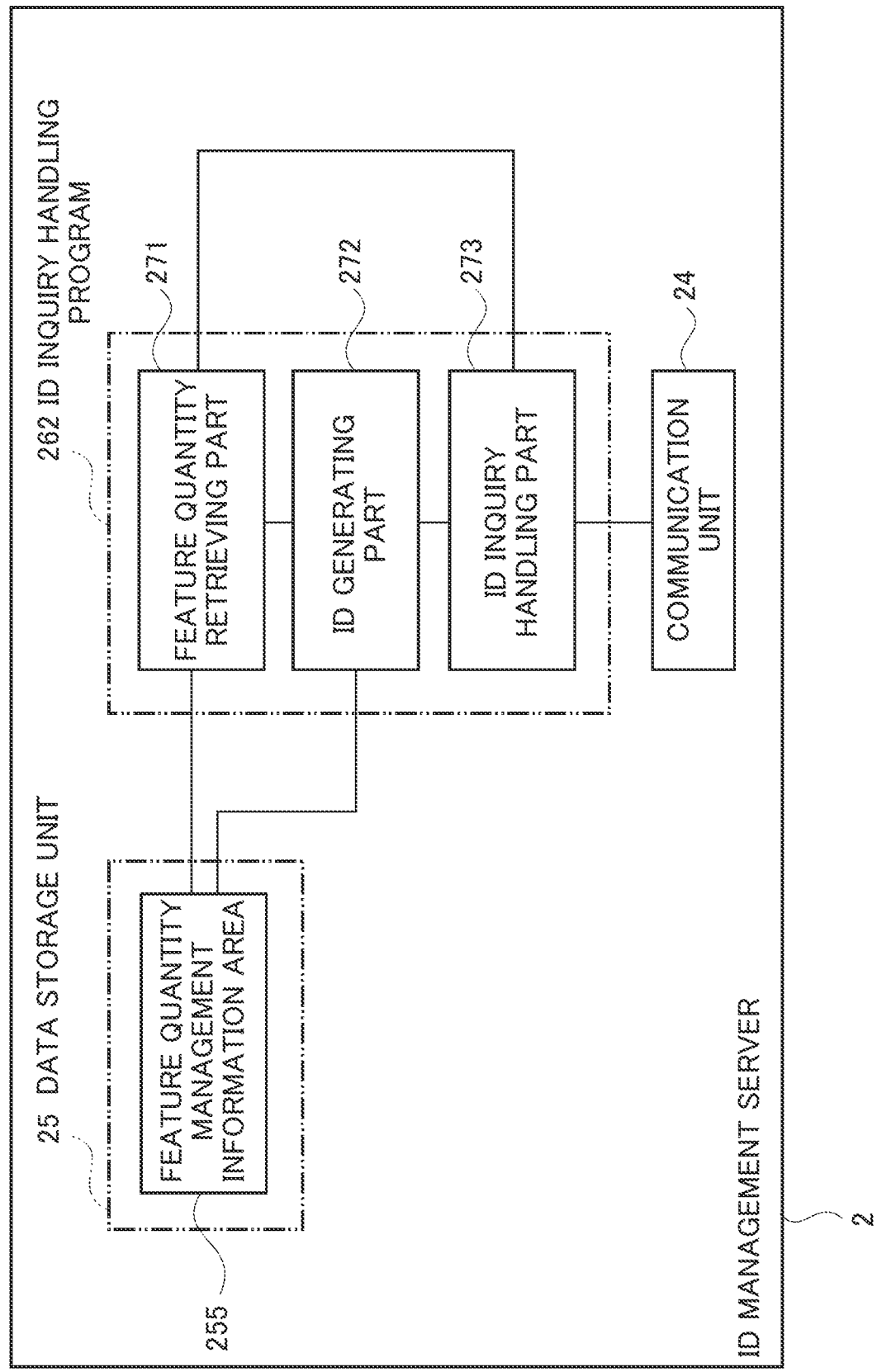
FIG. 44 A block diagram of the ID inquiry handling program in each embodiment of the present invention.

FIG. 44 schematically shows the functional structure of the ID inquire handling program 262 in the ID management server 2. A feature quantity retrieving part 271, an ID generating part 272, an ID inquiry handling part 273 of the ID inquiry handling program 262 access the feature quantity management information area 255 of the data storage unit 25. The functions of those parts will be described later in detail.

Referring now to FIGS. 4, 7, 8, and 9, the structure of each of the peers 3 is described in detail. Each of the peers 3 in the system manages the peer information on the other peers 3, and sets links to the other peers 3. In this manner, a logic network is established among the peers 3.

Each of the peers 3 includes a CPU 31, a memory 32, a bus 33, a communication unit 34, a data storage unit 35, and a program storage unit 36. The CPU 31 is a central processing unit that executes programs. The memory 32 is a memory device that provides a memory space for each program to operate, and may be a DRAM, for example. The bus 33 is a data path inside the peer 3, and connects the CPU 31, the memory 32, the communication unit 34, the data storage unit 35, and the program storage unit 36. The communication unit 34 is an interface between the inside of the peer 3 and the network 9.

The data storage unit 35 is a memory device that has a memory space for storing data, and may be a HDD, for example. The data storage unit 35 includes an ID management area 351, a peer information management area 352, a retained file management area 353, a file storage area 354, and a connected peer management area 355. The ID management area 351 stores the information on the correspondence between the metadata and the IDs. The peer information management area 352 stores the information on the correspondence between the IDs and peer information. The retained file management area 353 stores the information on the correspondence among the retained files, the metadata, and the IDs. The file storage area 354 stores files. The connected peer management area 355 manages the peer information on the other peers 3 in the system.

Figure 7:
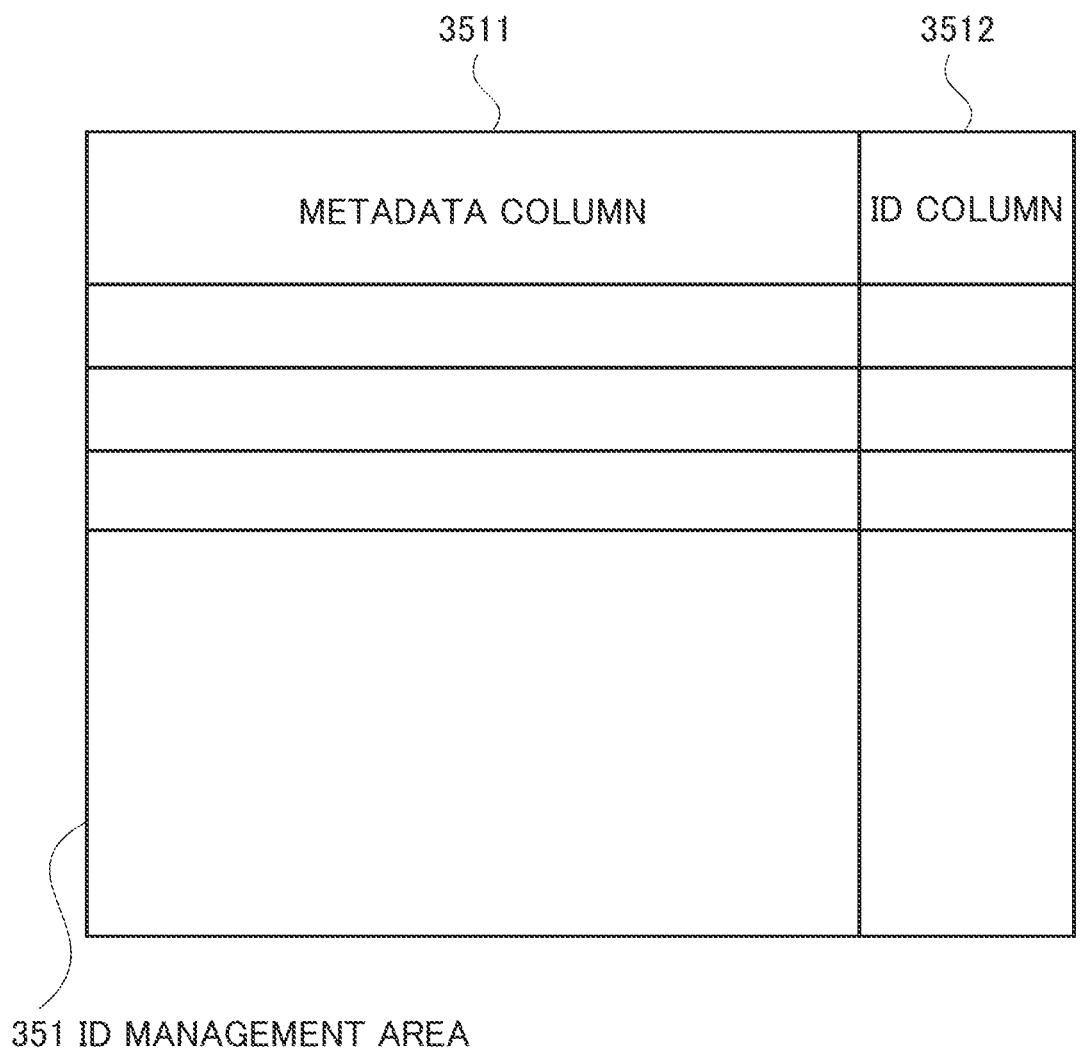
FIG. 7 A diagram shows the data structure of an ID management area in each embodiment of the present invention.

FIG. 7 shows the data structure in the ID management area 351. The ID management area 351 is a table that is formed with a metadata column 3511 and an ID column 3512. The metadata is stored in the metadata column 3511, and the IDs are stored in the ID column 3512.

FIG. 8 shows the data structure in the peer information management area 352. The peer information management area 352 is a table that is formed with an ID column 3521 and a peer information column 3522. The IDs are stored in the ID column 3521. The peer information is stored in the peer information column 3522.

FIG. 9 shows the data structure in the retained file management area 353. The retained file management area 353 is a table that is formed with a metadata column 3531, an ID column 3532, and a file pointer column 3533. The metadata is stored in the metadata column 3531. Pointers each pointing out one of the files stored in the file storage area 354 are stored in the file pointer column 3533.

The program storage unit 36 is a memory device that has a memory space for storing programs, and may be a HDD, for example. The program storage unit 36 and the data storage unit 35 may be physically the same memory device having different memory spaces allocated to the respective storage units 35 and 36. The program storage unit 36 stores a request issuance program 363 and a request handling program 364. The request issuance program 363 is a program that describes the operation to request information from the other peers 3. The request handling program 364 is a program that describes the operation to handle requests from the other peers 3.

Figure 45:
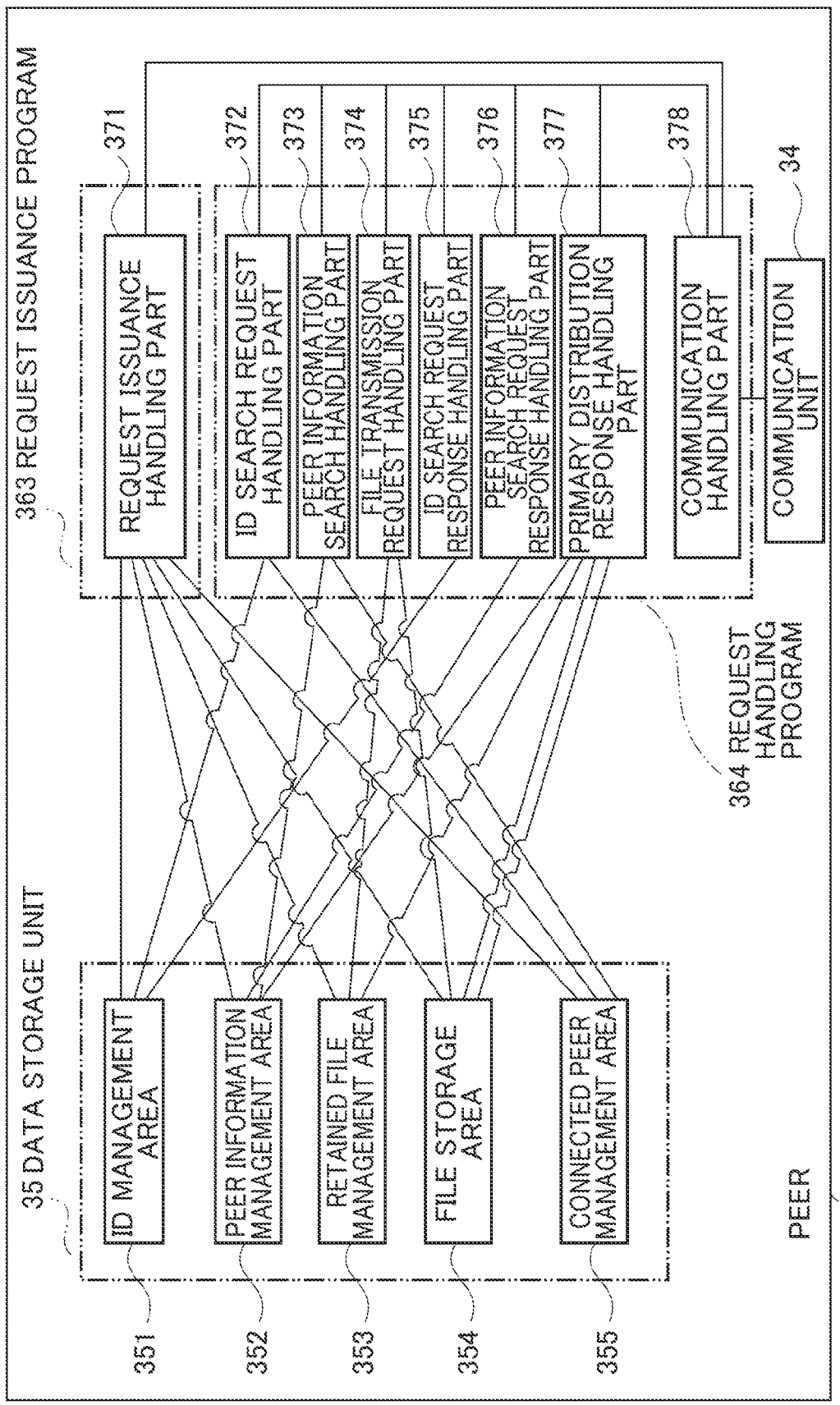
FIG. 45 A block diagram of each request issuance program and each request handling program in each embodiment of the present invention.

FIG. 45 schematically shows the functional structure of the request issuance program 363 and the request handling program 364 in each of the peers 3. The request issuance program 363 includes a request issuance handling part 371. The request handling program 364 includes an ID search request handling part 372, a peer information search handling part 373, a file transmission request handling part 374, an ID search request response handling part 375, a peer information search request response handling part 376, a primary distribution response handling part 377, and a communication handling part 378. The respective parts access the ID management area 351, the peer information management area 352, the retained file management area 353, the file storage area 354, and the connected peer management area 355 of the data storage unit 35, as shown in FIG. 45. The communication handling part 378 causes these parts to operate in accordance with communication data exchanged between the communication unit 34.

Figure 10:
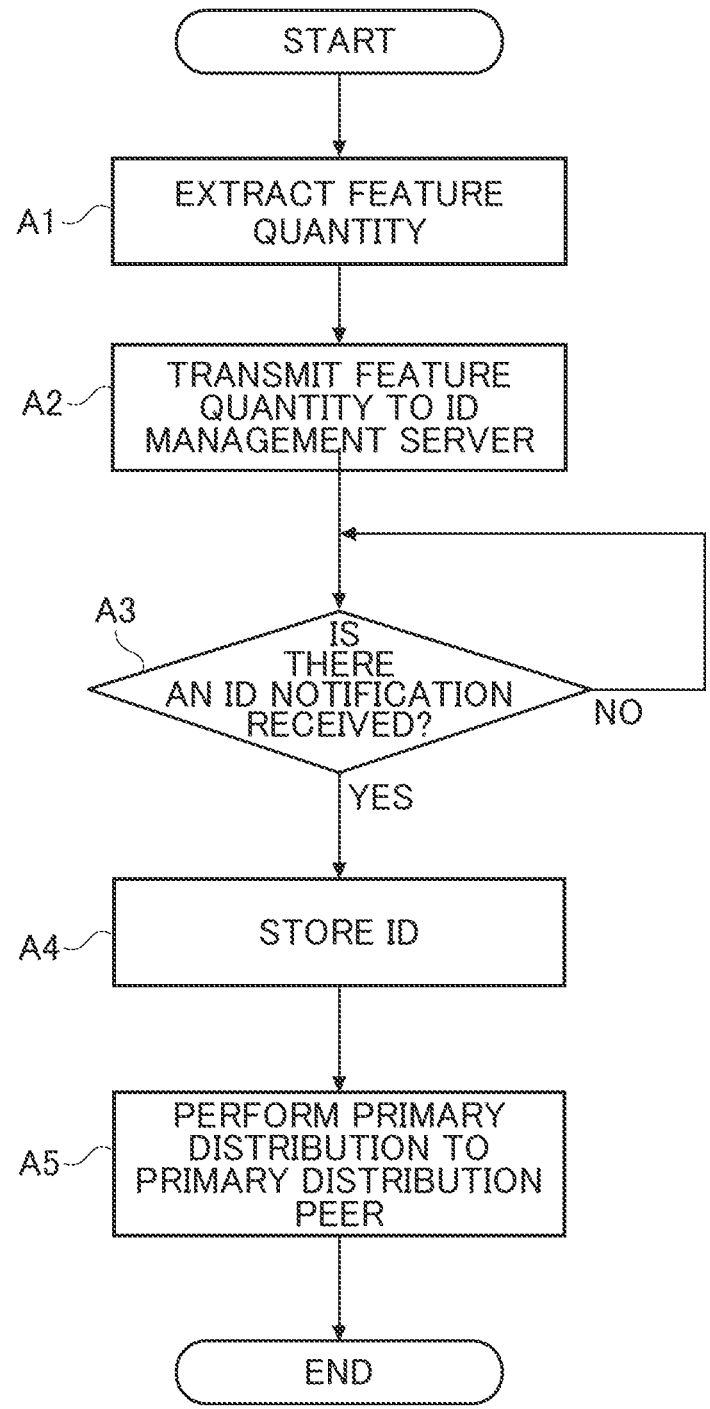
FIG. 10 A flowchart shows the operation of each distribution server in the first embodiment of the present invention.

Referring now to the flowchart shown in FIG. 10, the operation of each of the distribution servers 1 is described in detail. In this embodiment, the files of the contents to be distributed are stored in the file storage area 154, and the metadata and the file pointers corresponding to the files are stored in the retained file management area 153. The primary distribution peer management area 156 stores the peer information on one or more peers 3.

When starting distributing contents, the distribution server 1 executes the distribution program 161. After the distribution program 161 is activated, the feature quantity extracting part 171 extracts the feature quantity from the file (step A1). To extract the feature quantity, any technique such as the technique disclosed in Non Patent Literature 1 is used, but the same calculation operation is performed for any contents.

The ID inquiring part 172 transmits the extracted feature quantity to the ID management server 2, so as to make an ID inquiry request (step A2). When an ID notification is sent from the ID management server 2 (step A3), the ID inquiring part 172 stores the ID into the ID column 1532 of the retained file management area 153 (step A4). After the ID is stored, the distribution part 173 transmits the metadata of the contents to be distributed this time, the ID, and the file pointed out by the file pointer to the peer 3 registered in the primary distribution peer management area 156 (step A5). The procedure of step A5 is the primary distribution.

Figure 11:
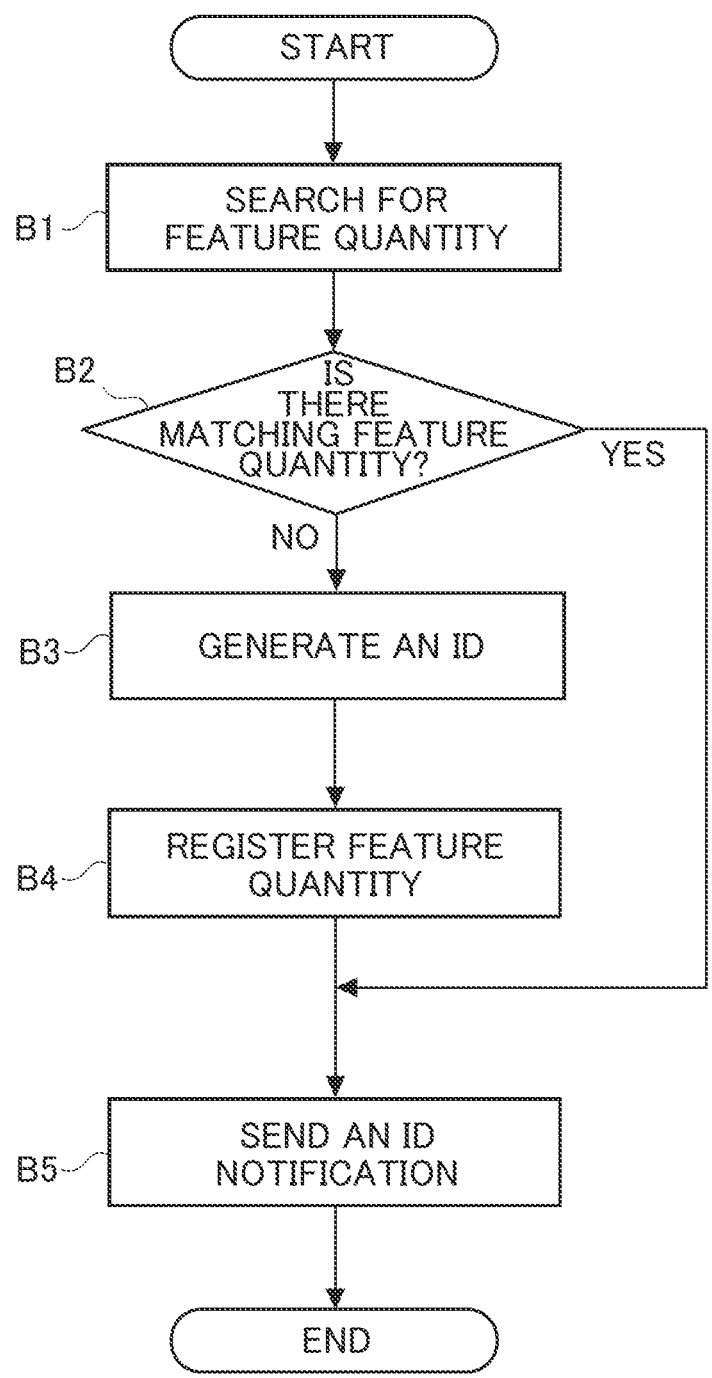
FIG. 11 A flowchart shows the operation of the ID management server in the first embodiment of the present invention.

Referring now to the flowchart shown in FIG. 11, the operation of the ID management server 2 is described in detail. Upon receipt of the ID inquiry request from the distribution server 1 (step A2 of FIG. 10), the ID management server 2 executes the ID inquiry handling program 262.

The ID inquiry handling part 273 of the ID inquiry handling program 262 recognizes that the ID inquiry request has been sent from the distribution server 1, and sends a notification to that effect to the feature quantity retrieving part 271. The feature quantity retrieving part 271 searches the feature quantity column 2551 of the feature quantity management information area 255 for candidates that match the feature quantity sent from the distribution server 1 (step B1). In this search, a predetermined margin may be added to the conditions for detecting the candidates that match the feature quantity. More specifically, not only the feature quantities that are exactly the same as the feature quantity sent from the distribution server 1, but also the feature quantities that slightly differ from the feature quantity sent from the distribution server 1 may be retrieved as the candidates from the feature quantities stored in the feature quantity management information area 255.

If the result of the search show that there are no candidates matching the feature quantity sent from the distribution server 1 (no in step B2), the ID generating part 272 generates a new ID that has not been registered in the ID column 2552 (step B3), and registers the generated ID and the feature quantity sent from the distribution server 1 on the same row in the feature quantity management information area 255 (step B4).

The ID inquiry handling part 273 notifies the distribution server 1 of the registered ID (step B5). If a feature quantity matching the feature quantity sent from the distribution server 1 is detected (yes in step B2), the ID inquiry handling part 273 notifies the distribution server 1 of the ID stored on the same row as the detected feature amount (step B5). The ID sent to the distribution server 1 is then registered in the retained file management area 153 of the distribution server 1 as described above (step A4 of FIG. 10).

Referring now to the flowcharts shown in FIGS. 12 through 19, the operations of the peers 3 are described in detail. It is assumed that the peer information on one or more other peers 3 is stored in the connected peer management area 355 of each of the peers 3 in the system.

Figure 12:
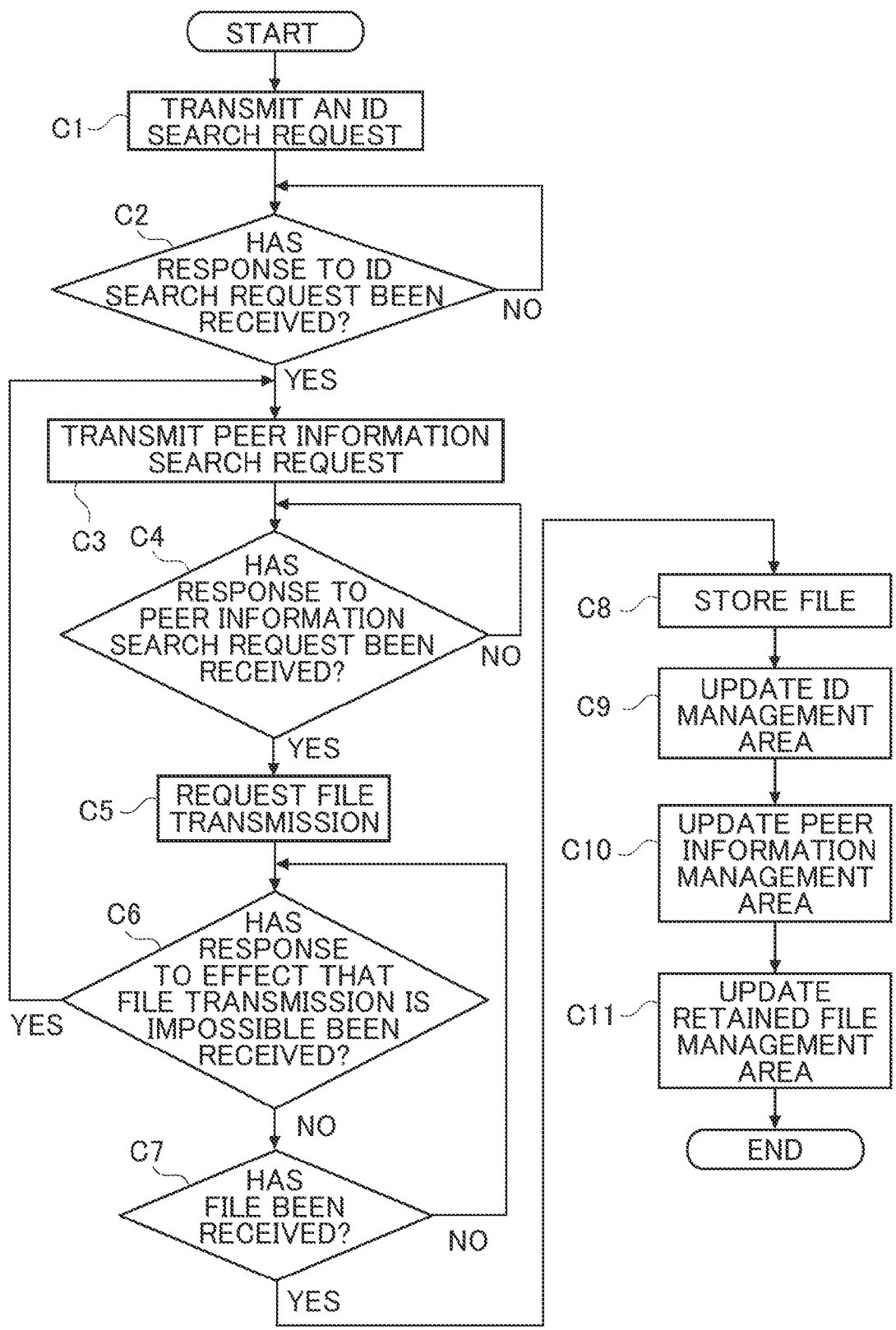
FIG. 12 A flowchart shows an operation of each peer in the first embodiment of the present invention.

Referring first to FIG. 12, a series of procedures to be carried out when one of the peers 3 obtains a contents file from another one of the peers 3 are described. This operation corresponds to the request issuance handling part 371 (FIG. 45) of the request issuance program 363, but is explained as the operation of each of the peers 3 in the following.

Each one of the peers 3 executes the request issuance program 363 so as to obtain a contents file from another one of the peers 3. After the request issuance program 363 is activated, the peer 3 transmits an ID search request to the other peers 3 with the use of the peer information registered in the connected peer management area 355, so as to acquire the ID of the contents to be obtained (step C1). The signal of the ID search request includes the conditions for retrieving the requested metadata and the value of TTL (Time to Live).

TTL indicates the maximum number of transferring the ID search request among the peers 3 over the network 9. By setting TTL, unlimited transfers of ID search requests can be prevented among the peers 3. If a large value is set to TTL, the possibility of successful searches becomes higher, but convergence is caused in the network 9. Therefore, a reasonable value should be set to TTL in accordance with the number of peers 3, the bandwidth of the network 9, and the likes.

The peer 3 then awaits a response from the other peers 3 in reply to the ID search request (step C2). After receiving a response, the peer 3 transmits a peer information search request to the other peers 3 registered in the connected peer management area 355, so as to obtain the information on the peer 3 retaining the contents file having the ID included in the response (step C3). The peer information search request includes the ID of the target file and the TTL value. The TTL value may be the same as the TTL in the ID search request (step C1) or may be a different value from the TTL in the ID search request.

The peer 3 awaits a response from the other peers 3 in reply to the peer information search request (step C4). After receiving a response, the peer 3 transmits a file transmission request to the peer corresponding to the peer information sent along with the response (step C5).

If the peer 3 receives a response to the effect that transmission of the target file cannot be performed in reply to the file transmission request (yes in step C6), the peer 3 again transmits a peer information search request so as to search for the peer that can transmit the file (step C3). If the peer information sent in reply to the peer information search request indicates more than one peer, a file transmission request may be sent to the other peers indicated by the peer information.

If the peer that has received the file transmission request can transmit the target file, the file as well as the metadata and the ID are transmitted to the requesting peer 3. After receiving the file (yes in step C7), the requesting peer 3 stores the file into the file storage area 354 (step C8).

By storing the received metadata and the received ID into a blank row in the ID management area 351, the peer 3 updates the information in the ID management area 351 (step C9). The peer 3 also stores the I received D and the peer information on the other peer 3 that has transmitted the file into a blank row in the peer information management area 352. By doing so, the peer 3 updates the information in the peer information management area 352 (step C10). The peer 3 further stores the received metadata, the received ID, and the pointer pointing out the received file into a blank row in the retained file management area 353. By doing so, the peer 3 updates the information in the retained file management area 353 (step C11). Here, the series of procedures carried out by the peer 3 to obtain contents from another peer 3 is completed.

In the above series of procedures, the following operation is performed between the peer 3 and the other peers 3. The following operation is equivalent to the request handling program 364.

Figure 13:
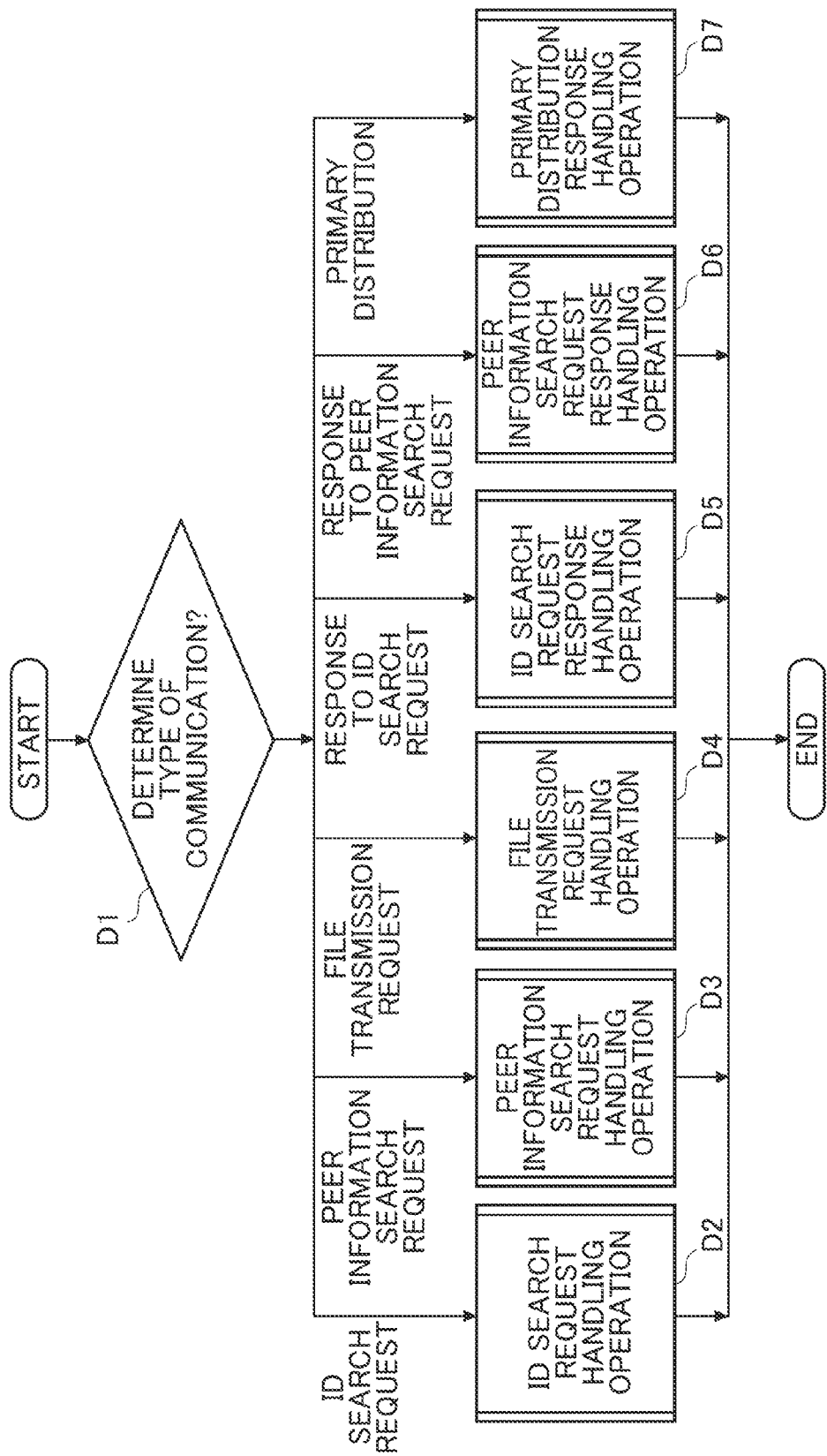
FIG. 13 A flowchart shows an operation of each peer in each embodiment of the present invention.

Referring now to FIG. 13, a control operation to be performed by the communication handling part 378 (FIG. 45) of the request handling program 364 is described. The communication handling part 378 determines the type of communication to be performed (step D1). If the communication to be performed is an ID search request, the communication handling part 378 instructs the ID search request handling part 372 to perform an ID search request handling operation (step D2). If the communication to be performed is a peer information search request, the communication handling part 378 instructs the peer information search handling part 373 to perform a peer information search request handling operation (step D3). If the communication to be performed is a file transmission request, the communication handling part 378 instructs the file transmission request handling part 374 to perform a file transmission request handling operation (step D4). If the communication to be performed is a response to an ID search request, the communication handling part 378 instructs the ID search request response handling part 375 to perform an ID search request response handling operation (step D5). If the communication to be performed is a response to a peer information search request, the communication handling part 378 instructs the peer information search request response handling part 376 to perform a peer information search request response handling operation (step D6). If the communication to be performed is a primary distribution, the communication handling part 378 instructs the primary distribution response handling part 377 to perform a primary distribution response handling operation (step D7).

Figure 14:
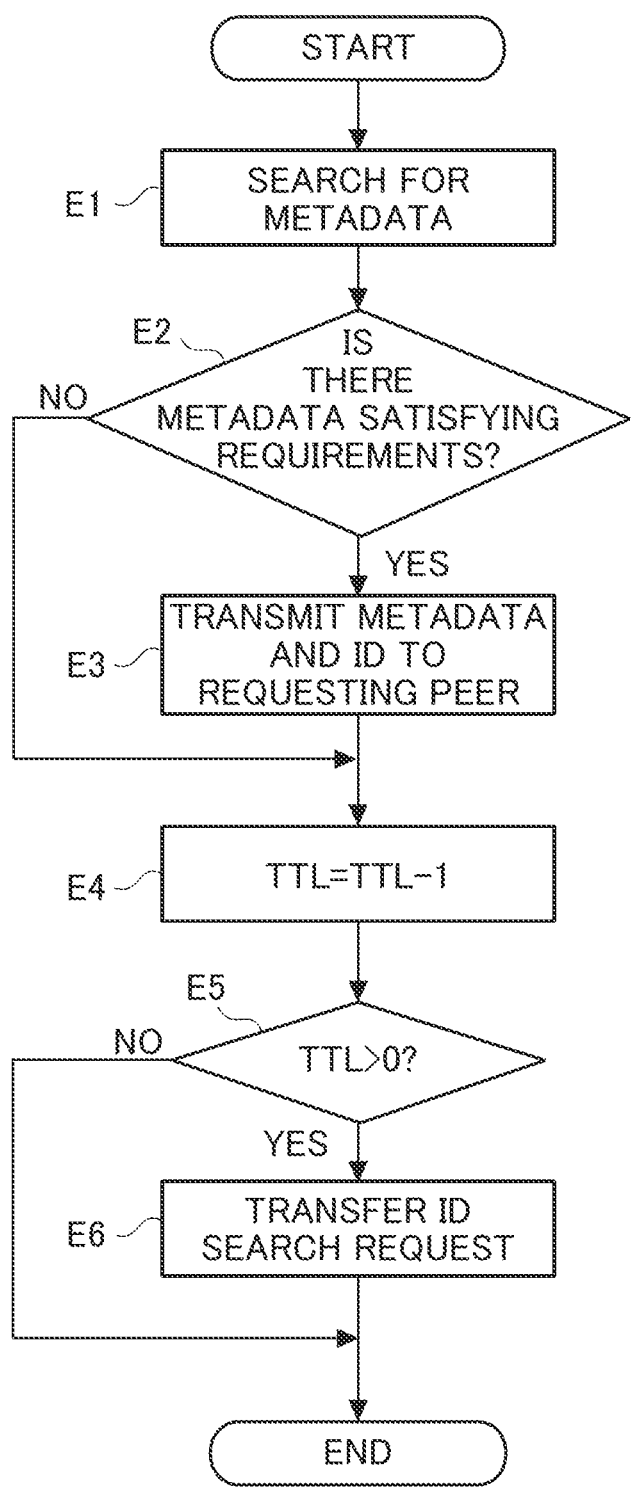
FIG. 14 A flowchart shows an operation of each peer in each embodiment of the present invention.

Referring now to FIG. 14, the procedures in the ID search request handling operation (step D2 of FIG. 13) to be performed by the ID search request handling part 372 are described. The ID search request handling part 372 recognizes the metadata conditions described in an ID search request received directly from the requesting peer 3, or the metadata conditions for an ID search request transferred from a requester via another peer. The ID search request handling part 372 then searches the metadata column 3511 of the ID management area 351 for the metadata satisfying the metadata conditions (step E1). If there are two or more pieces of registered metadata, only the item(s) satisfying the received conditions should be retrieved.

If metadata satisfying the conditions is detected by the above search (step E2), the ID search request handling part 372 returns the detected metadata and the ID stored in the same row as the metadata in the ID column 3512 (step E3). Here, the peer 3 as the destination of the reply is the peer at the previous hop in the transfer path or the peer that has transferred the ID search request to the peer 3 performing this operation. Returning a response to the ID search request to the previous hop is transferring the response through the transfer path of the ID search request in the opposite direction.

When the procedure of step E3 is completed or if metadata satisfying the metadata conditions is not detected from the ID management area 351 (no in step E2), the ID search request handling part 372 subtracts "1" from the TTL value of the ID search request (step E4). If the TTL value after the subtraction is larger than "0" (yes in step E5), the ID search request handling part 372 transfers the ID search request to another one of the peers 3 registered in the connected peer management area 355 (step E6). If the TTL value after the subtraction is "0" (no in step E5), the ID search request handling part 372 does not perform another transfer of the ID search request. Because this case means that the number of transfers has reached the maximum number.

Figure 15:
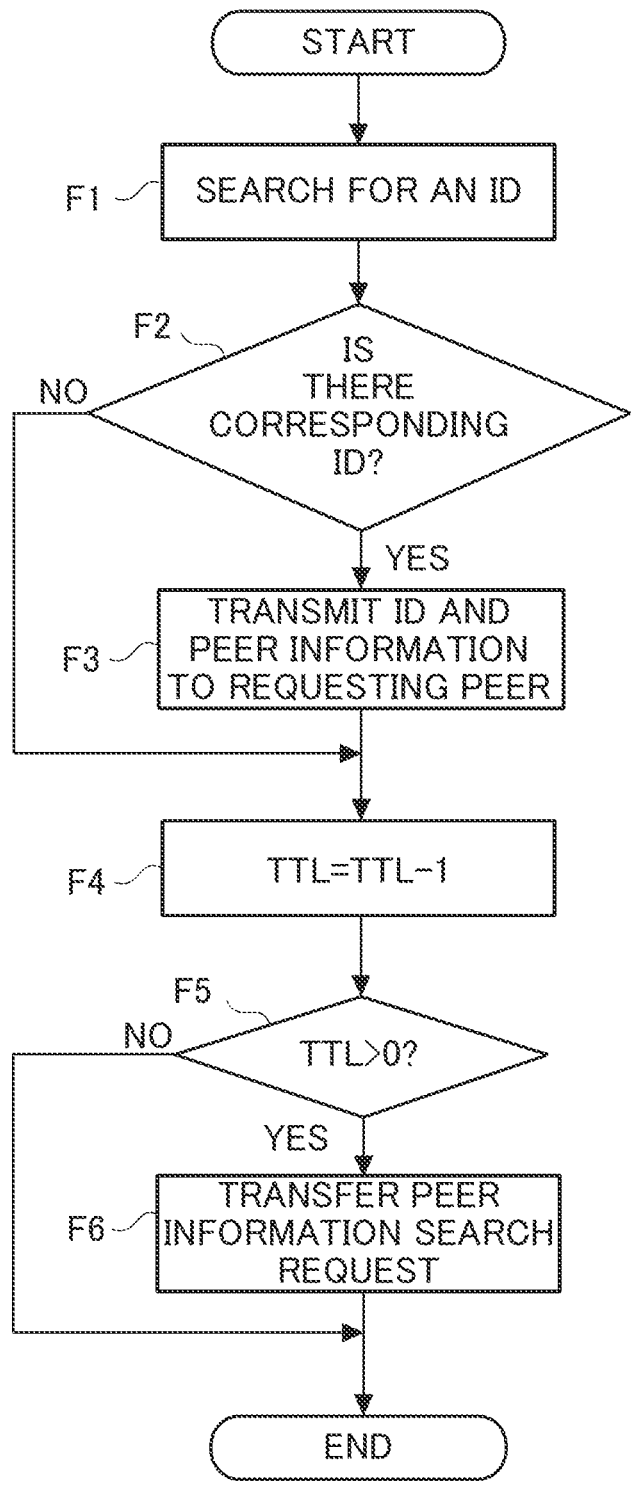
FIG. 15 A flowchart shows an operation of each peer in the first embodiment of the present invention.

Referring now to FIG. 15, the procedures in the peer information search request handling operation (step D3 of FIG. 13) to be performed by the peer information search handling part 373 are described. The peer information search handling part 373 recognizes the ID described in a peer information search request received directly from the requesting peer 3 or in a peer information search request transferred from the requester via another peer. The peer information search handling part 373 searches the ID column 3521 for the corresponding ID (step F1).

If the ID is detected by the above search (yes in step F2), the peer information search handling part 373 returns the ID and the peer information stored in the same row as the ID in the peer information column 3522 to the peer at the previous hop (step F3).

When the procedure of step F3 is completed or if the corresponding ID is not detected from the ID column 3521 (no in step F2), the peer information search handling part 373 subtracts "1" from the TTL value of the peer information search request (step F4). If the TTL value after the subtraction is larger than "0" (yes in step F5), the peer information search handling part 373 transfers the peer information search request to another one of the peers 3 registered in the connected peer management area 355 (step F6). If the TTL value after the subtraction is "0" (no in step F5), the peer information search handling part 373 does not transfer the peer information search request.

Figure 16:
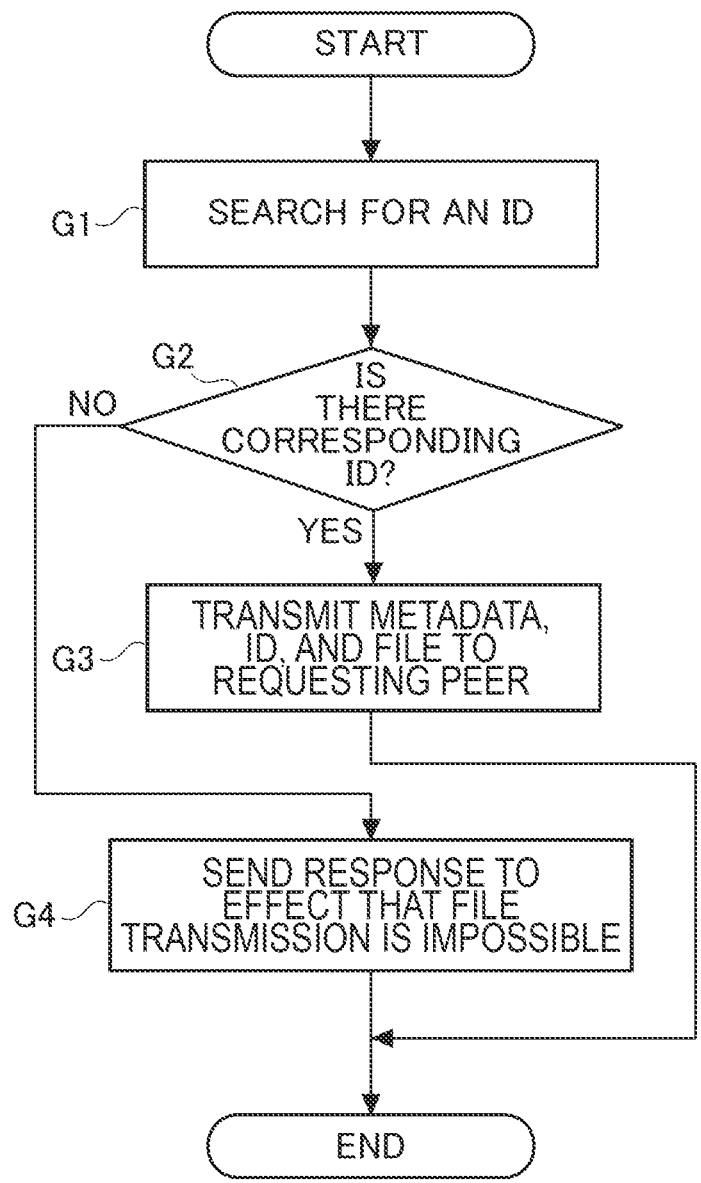
FIG. 16 A flowchart shows an operation of each peer in the first embodiment of the present invention.

Referring now to FIG. 16, the procedures in the file transmission request handling operation (step D4 of FIG. 13) to be performed by the file transmission request handling part 374 are described. The file transmission request handling part 374 searches the ID column 3532 of the retained file management area 353 for the ID corresponding to the ID written in the file transmission request received from the requesting peer 3 (step G1).

If the ID is detected by the above search (yes in step G2), the file transmission request handling part 374 returns the ID, the metadata in the same row as the ID, and the file in the file storage area 354 pointed out by the file pointer in the same row as the ID in the file pointer column 3533 to the requesting peer 3 (step G3). If the corresponding ID is not detected from the file management area 353 (no in step G2), the file transmission request handling part 374 sends a response to the requesting peer 3 to the effect that file transmission cannot be performed (step G4).

Figure 17:
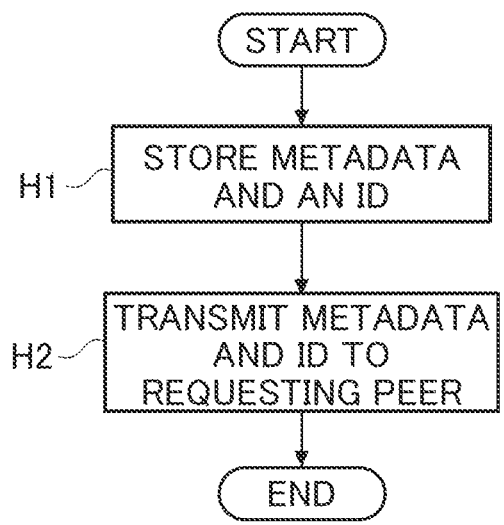
FIG. 17 A flowchart shows an operation of each peer in each embodiment of the present invention.

Referring now to FIG. 17, the procedures in the ID search request response handling operation (step D5 of FIG. 13) to be performed by the ID search request response handling part 375 are described. This operation is to be performed when the peer 3 performing this operation receives the metadata and the ID returned from another peer 3 in response to an ID search request (step E3 of FIG. 14).

The ID search request response handling part 375 stores the metadata and the ID returned from another peer 3 into a blank row in the ID management area 351 (step H1). The ID search request response handling part 375 also transfers the metadata and the ID to the peer 3 at the previous hop (step H2).

Figure 18:
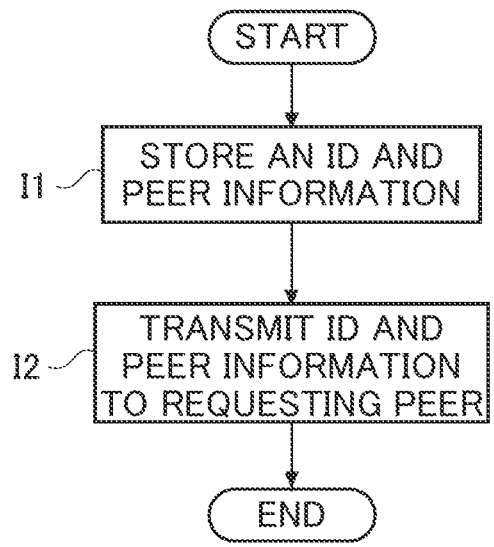
FIG. 18 A flowchart shows an operation of each peer in the first embodiment of the present invention.

Referring now to FIG. 18, the procedures in the peer information search request response handling operation (step D6 of FIG. 13) to be performed by the peer information search request response handling part 376 are described. This operation is to be performed when the peer 3 performing this operation receives the ID and the peer information returned from another peer 3 in response to a peer information search request (step F3 of FIG. 15).

The peer information search request response handling part 376 stores the ID and the peer information returned from another peer 3 into a blank row in the peer information management area 352 (step I1). The peer information search request response handling part 376 also transfers the ID and the peer information to the peer 3 at the previous hop (step I2).

Figure 19:
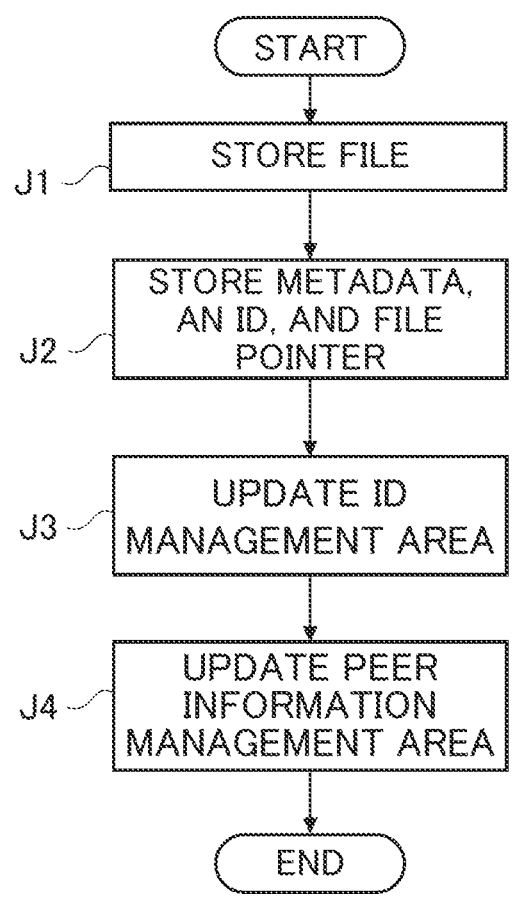
FIG. 19 A flowchart shows an operation of each peer in the first embodiment of the present invention.

Referring now to FIG. 19, the procedures in the primary distribution response handling operation (step D7 of FIG. 13) to be performed by the primary distribution response handling part 377 are described. This operation is to be performed where the peer 3 performing this operation receives a contents file transmitted from the distribution servers 1 by the above described primary distribution (step A5 of FIG. 10).

The primary distribution response handling part 377 stores the file received from the distribution server 1 into the file storage area 354 (step J1). The primary distribution response handling part 377 also stores the metadata and the ID received at the same time into a blank row in the retained file management area 353, and stores the pointer indicating the position of the file just stored in the file storage area 354 into the same row in the file pointer column 3533 (step J2). The primary distribution response handling part 377 further stores the received metadata and ID into a blank row in the ID management area 351 (step J3), and stores the received ID and its own peer information into a blank row in the peer information management area 352 (step J4).

In accordance with this embodiment, the same ID is allotted to all contents having the same feature quantity, and such IDs are used as the conditions for searching contents. Accordingly, the possibility that desired contents is successfully obtained can be made higher.

Specific Example

The operations in accordance with this embodiment are now described in greater detail by way of a more specific example. FIG. 20 illustrates a system 100a of this example. In the following description, two distribution servers (1a and 1b) of the distribution servers in the system 100a, the ID management server 2, and the six peers (3a through 3f) of the peers in the system 100a are explained.

Figure 30:
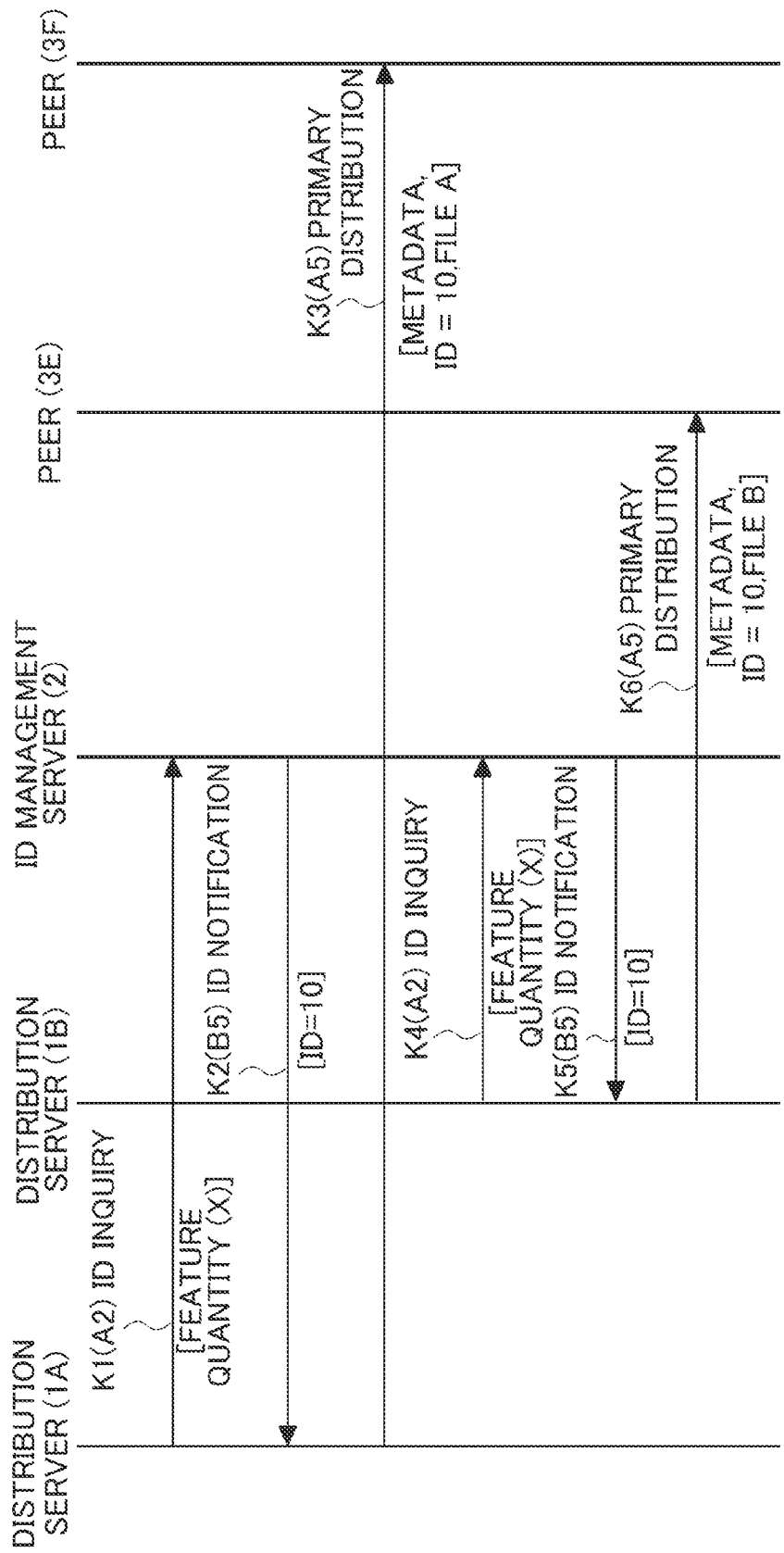
FIG. 30 A sequence diagram shows an operation in the specific example of the first embodiment of the present invention.

Referring to FIGS. 20 through 24 and the sequence chart shown in FIG. 30, the operation to be performed when a file distribution is started in the system 100*a* is described. The states (a) through (c) shown in FIG. 21 indicate the state transitions of the retained file management areas 153*a* and 153*b* of the distribution servers 1*a* and 1*b*. FIG. 22 shows the states of the file storages areas 154*a* and 154*b* of the distribution servers 1*a* and 1*b*. FIG. 23 shows the states of the primary distribution peer management areas 156*a* and 156*b* of the distribution servers 1*a* and 1*b*. The states (a) and (b) shown in FIG. 24 indicate the state transition of the feature quantity management information area 255 of the ID management server 2.

There is no data stored in any of the portions having "(NULL)" written therein in the above mentioned drawings, and there is no further data stored below each row having "(NULL)" written in all the columns therein. Meanwhile, "Adr( )" represents the address as peer information in the network, and the reference numeral and alphabet in each of the brackets is the reference numeral and alphabet of each corresponding one of the peers (3*a* through 3*f*). For example, "Adr(3*e*)" is the address of the peer 3*e* in the network. In the sequence chart shown in FIG. 30, the insides of the brackets "[ ]" represent the contents of the data to be transmitted in the respective communications. Those symbols and forms "(NULL)", "Adr( )", and the brackets "[ ]" in the sequence chart are the same as those to be used in later explanation.

As for the distribution servers 1*a* and 1*b*, each of the retained file management areas 153 is now in the state (a) shown in FIG. 21, each of the file storage areas 154 is in the state shown in FIG. 22, and each of the primary distribution peer management areas 156 is in the state shown in FIG. 23. The feature quantity management information area 255 of the ID management server 2 is in the state (a) shown in FIG. 24. As shown in FIG. 22, the distribution server 1*a* retains a file A, and the distribution server 1*b* retains a file B. The distribution of either of the files has not been started yet.

The file A and the file B are video files of the same contents X, but are in different formats: "format a" and "format b", as indicated in the state (a) in FIG. 21. As for the metadata, "title=YY" is set in the file A, and "title=ZZ" is set in the file B.

The operation to be performed under the conditions described above when the distribution server 1*a* starts distributing the file A is first described. This operation is started in response to an instruction or the like issued to the distribution server 1*a* from outside via a user interface (not shown) or the network.

When the distribution server 1*a* starts distributing the file A, the distribution program 161 of the distribution server 1*a* extracts "feature quantity (X)" as the feature quantity of the file A, and transmits an ID inquiry request having the feature quantity written therein to the ID management server 2 (step K1 in FIG. 30). Here, the "feature quantity (X)" represents the feature quantity that is extracted from the contents X and does not vary with the types of formats.

Having Received the ID inquiry from the distribution server 1*a*, the ID management server 2 activates the ID inquiry handling program 262, and searches the feature quantity management information area 255 for the information corresponding to the "feature quantity (X)" transmitted from the distribution server 1*a*. However, the information corresponding to the "feature quantity (X)" is not registered here, since the feature quantity management information area 255 at this point is in the state (a) shown in FIG. 24.

The ID management server 2 then generates a new ID "10", and registers the new ID in the feature quantity management information area 255. As a result, the state of the feature quantity management information area 255 of the ID management server 2 is updated from the state (a) to the state (b) shown in FIG. 24. After finishing the above registration, the ID management server 2 notifies the distribution server 1*a* of the registered ID (step K2 in FIG. 30).

Having received the ID from the ID management server 2, the distribution server 1*a* stores the received ID "10" into the ID column in the row of the file A in the retained file management area 153*a*. The retained file management area 153*a* of the distribution server 1*a* and the retained file management area 153*b* of the distribution server 1*b* at this point are in the state (b) shown in FIG. 21. In the state (b), there are no changes from the state (a) on the side of the distribution server 1*b* (153*b*), while the ID column on the side of the distribution server 1*a* (153*a*) is updated.

The distribution server 1*a* then performs the primary distribution of the file A toward the address "Adr(3*f*)" (FIG. 23) stored in the primary distribution peer management area 156*a* of its own or toward the peer 3*f* (step K3 in FIG. 30). In this primary distribution, the information stored in the metadata column and the ID column in the retained file management area 153*a* in the state (b) shown in FIG. 21, as well as the file A, is delivered.

The distribution server 1*b* next starts distributing the file B. The distribution program 161 of the distribution server 1*b* extracts the feature quantity of the file B, and transmits an ID inquiry having the feature quantity written therein to the ID management server 2 (step K4 in FIG. 30). Since the file B is a file of the contents X like the file A of the distribution server 1*a*, the "feature quantity "X"") is obtained as the feature quantity.

Having received the ID inquiry from the distribution server 1*b*, the ID management server 2 activates the ID inquiry handling program 262, and searches the feature quantity management information area 255 for the information corresponding to the "feature quantity (X)" transmitted from the distribution server 1*b*. The feature quantity management information area 255 at this point is in the state (b) shown in FIG. 24, and a record about the "feature quantity (X)" is already registered. Therefore, the ID management server 2 reads the ID "10" from the ID column of the registered record, and notifies the distribution server 1*b* of the ID "10" (step K5 in FIG. 30).

Having received the ID notification from the ID management server 2, the distribution server 1*b* stores the received ID "10" into the ID column in the row allotted to the file B in the retained file management area 153*b*. The retained file management areas 153*a* and 153*b* of the distribution servers 1*a* and 1*b* at this point are in the state (c) shown in FIG. 21. In the state (c), the ID column on the side of the distribution server 1*b* (153*b*) is updated from the state (b).

The distribution server 1*b* then performs the primary distribution of the file B toward the address "Adr(3*e*)" (FIG. 23) stored in the primary distribution peer management area 156*b* of its own or toward the peer 3*e* (step K6 in FIG. 30). In this primary distribution, the information stored in the metadata column and the ID column in the retained file management area 153*b* in the state (c) shown in FIG. 21, as well as the file B, is delivered.

Figure 31:
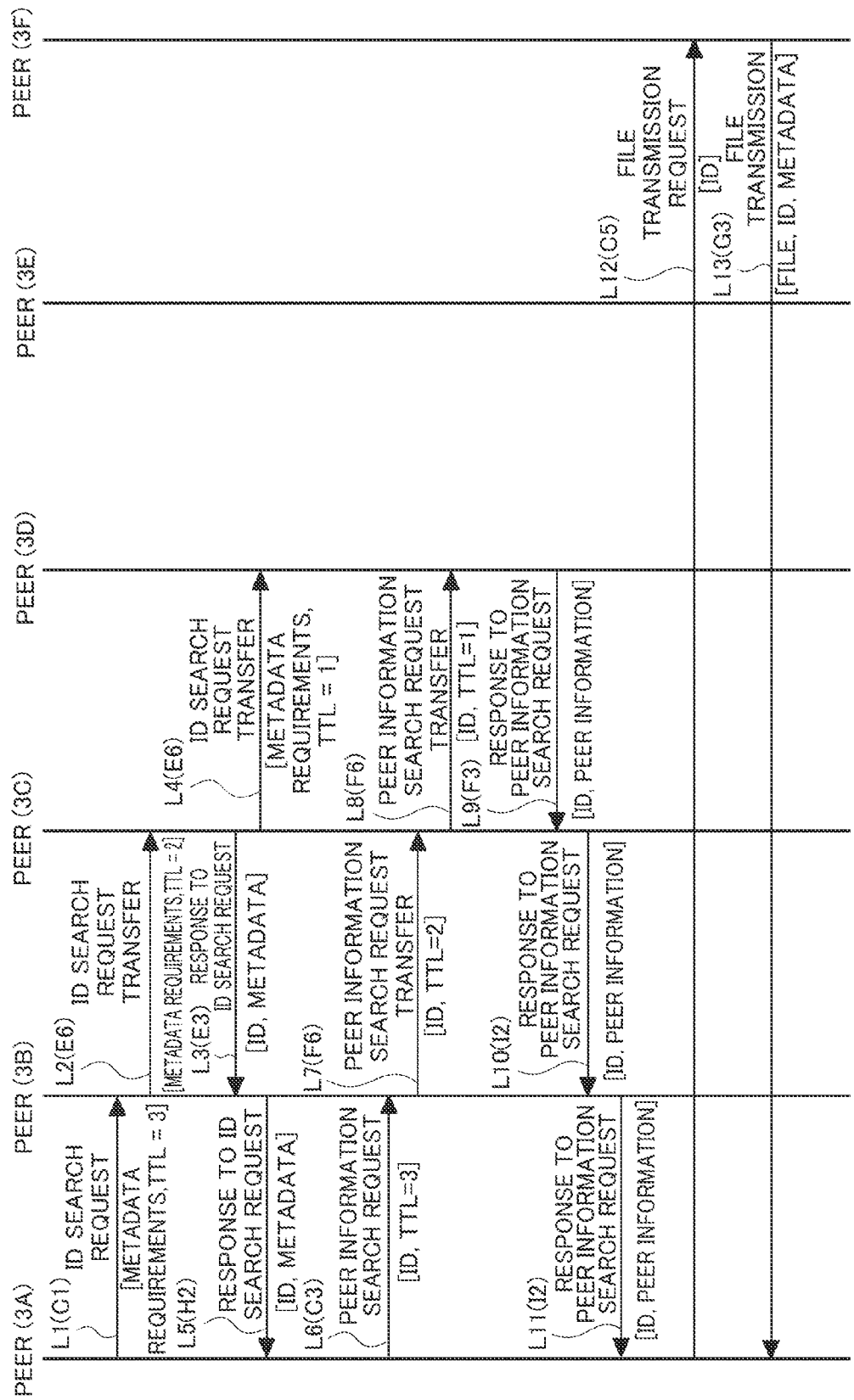
FIG. 31 A sequence diagram shows an operation in the specific example of the first embodiment of the present invention.

Referring now to FIG. 20, FIGS. 25 through 29, and the sequence chart shown in FIG. 31, operations among the peers 3 in the system 100*a* as the specific example are described. The states (a) through (c) shown in FIG. 25 indicate the state transitions of the ID management areas 351*a* through 351*e* of the peers 3*a* through 3*e*. The states (a) through (c) shown in FIG. 26 indicate the state transitions of the peer information management areas 352*a* through 352*e* of the peers 3*a* through 3*e*. FIG. 27 shows the states of the connected peer management areas 355a through 355e of the peers 3a through 3e. The states (a) and (b) shown in FIG. 28 indicate the state transitions of the retained file management areas 353a, 353e, and 353f of the peers 3a, 3e, and 3f. The states (a) and (b) shown in FIG. 29 indicate the state transitions of the file storage areas 354a, 354e, and 354f of the peers 3a, 3e, and 3f.

Figure 25:
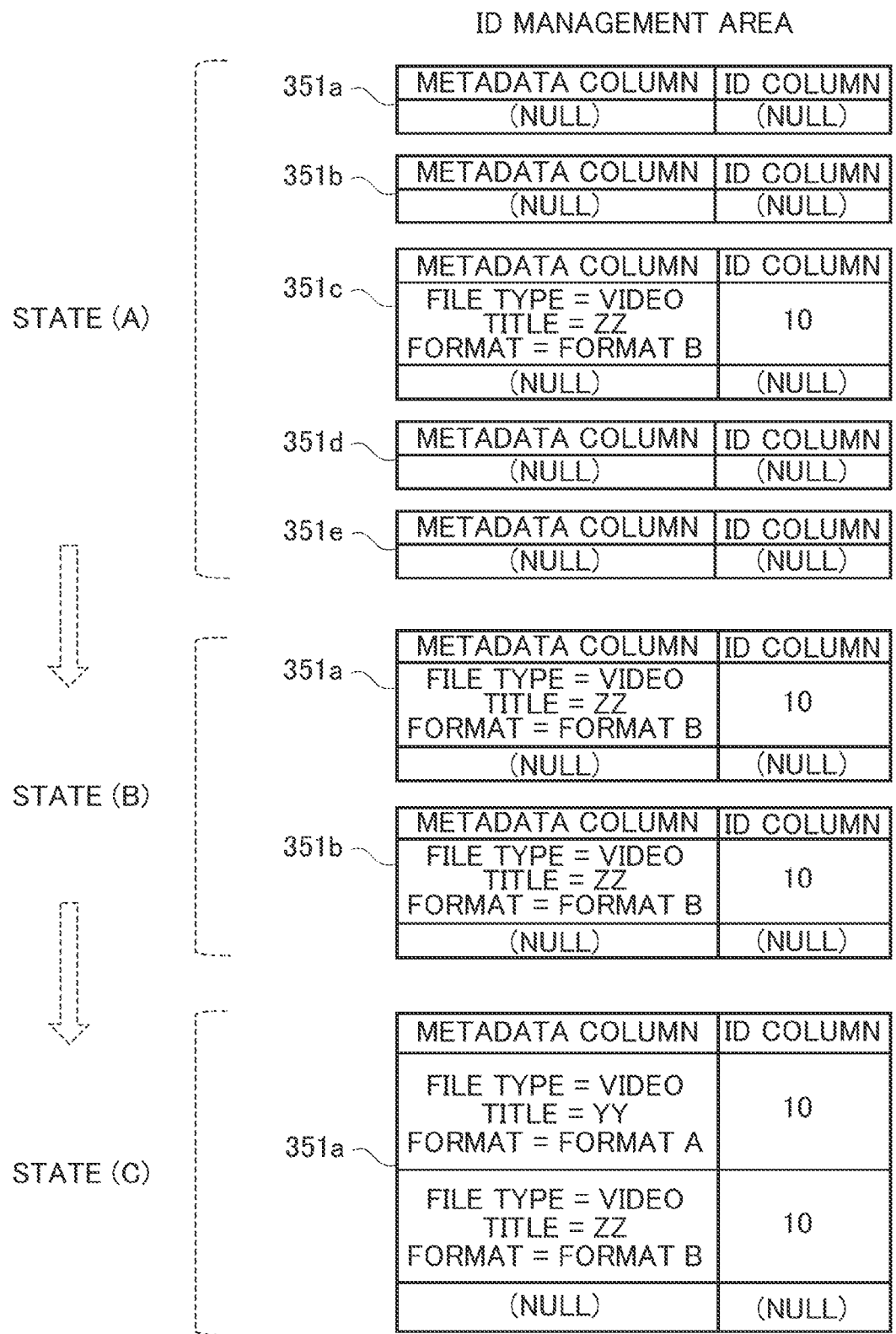
FIG. 25 A diagram shows the data structure of an ID management area in the specific example of the first embodiment of the present invention.
Figure 26:
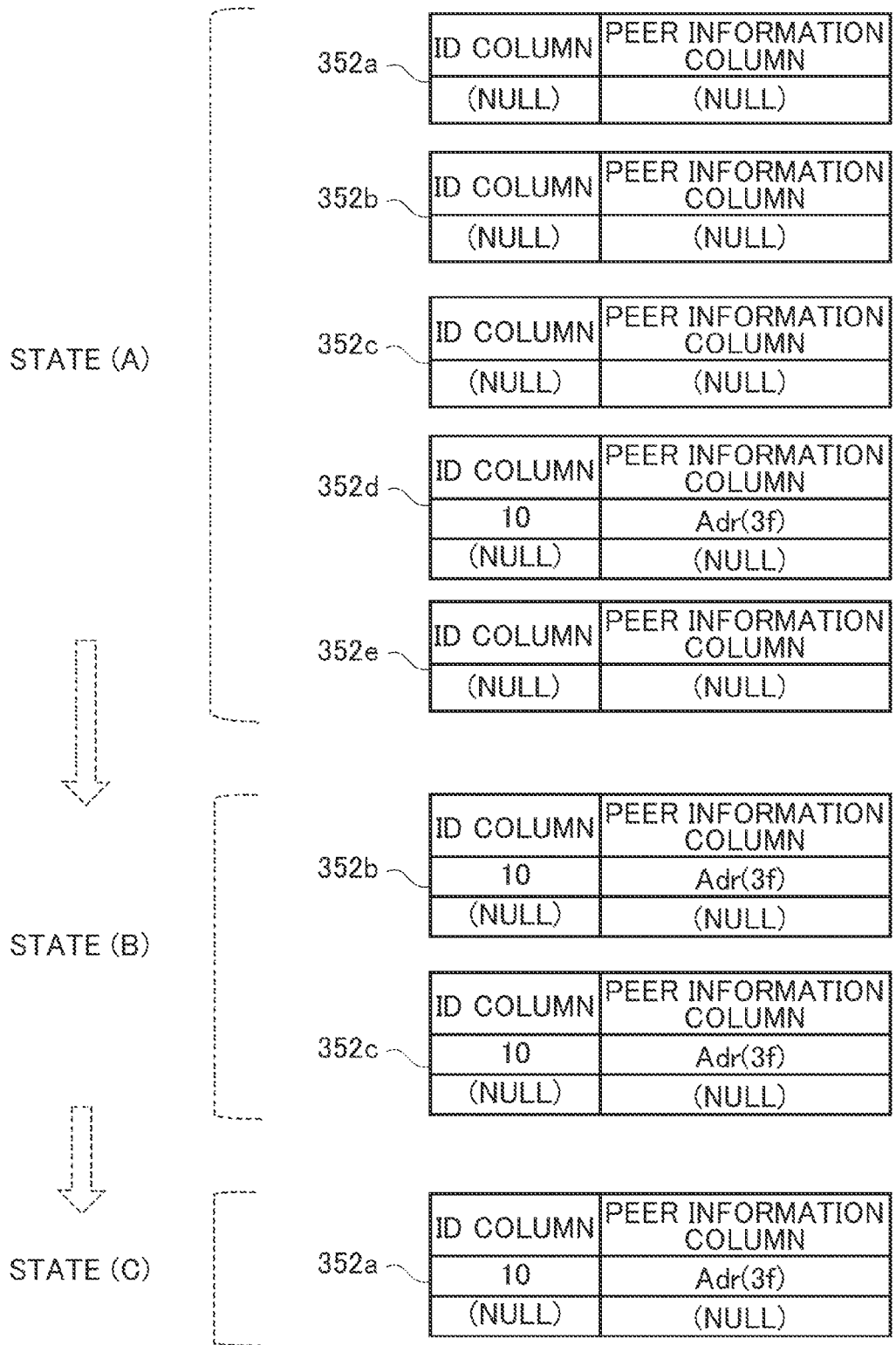
FIG. 26 A diagram shows the data structure of a peer information management area in the specific example of the first embodiment of the present invention.

In the peers 3a through 3e, the ID management areas 351 are now in the state (a) shown in FIG. 25, the peer information management areas 352 are in the state (a) shown in FIG. 26, and the connected peer management areas 355 are in the state shown in FIG. 27. In the peers 3a, 3e, and 3f, the retained file management areas 353 are in the state (a) shown in FIG. 28, and the file storage areas 354 are in the state (a) shown in FIG. 29. As can be seen from FIG. 25, the metadata about the file B and the ID of the file B are stored in the ID management area 351c of the peer 3c. As can be seen from FIG. 26, the ID "10" and the address of the peer 3f are stored in the peer information management area 352d of the peer 3d. As can be seen from FIG. 29, the file B is stored in the peer 3e, and the file A is stored in the peer 3f.

The operation to be performed under the conditions described above when the peer 3a obtains the file satisfying the metadata requirements "file type=video, title=ZZ" from another peer is now described. This operation is started in response to an instruction or the like issued to the peer 3a from outside via a user interface (not shown) or the network.

The peer 3a first transmits an ID search request to the address "Adr(3b)" (FIG. 27) registered in the connected peer management area 355a, or to the peer 3b (step L1 in FIG. 31). In this ID search request, "file type=video, title=ZZ" as the metadata requirements and a TTL value "3" are written.

Recognizing the receipt of the ID search request from the peer 3a, the peer 3b searches the metadata column in the ID management area 351b for the metadata satisfying the designated requirements. However, there is no metadata satisfying the requirements in the ID management area 351b, since the ID management area 351b at this point is in the state (a) shown in FIG. 25.

The peer 3b subtracts "1" from the TTL value of the ID search request, and recognizes "TTL=2". Since the TTL value at this point is larger than 0 (TTL>0), the number of transfers performed has not reached the maximum number. The peer 3b then transfers the ID search request having the TTL value "2" (TTL=2) to the address of a peer that is not the peer 3a at the previous hop among the addresses registered in the connected peer management area 355b (FIG. 27), or to the address "Adr(3c)" of the peer 3c in order to transfer the ID search request (step L2 in FIG. 31).

Recognizing the receipt of the ID search request from the peer 3b, the peer 3c searches the metadata column in the ID management area 351c for the metadata satisfying the designated metadata requirements. The ID management area 351c at this point is in the state (a) shown in FIG. 25, and the metadata "file type=video, title=ZZ" that satisfies the requirements is stored in the metadata column. Accordingly, in response to the ID search request, the peer 3c returns the metadata "file type=video, title=ZZ, format=format b" read out from the ID management area 351c, and the ID "10" to the peer 3b at the previous hop (step L3 in FIG. 31).

The peer 3c subtracts "1" from the TTL value of the ID search request, and recognizes "TTL=1". Since the TTL value at this point is larger than 0 (TTL>0), the number of transfers performed has not reached the maximum number. The peer 3c then transfers the ID search request having the TTL value "1" (TTL=1) to the address of a peer that is not the peer 3b at the previous hop among the addresses registered in the connected peer management area 355c (FIG. 27), or to the address "Adr(3d)" of the peer 3d in order to transfer the ID search request (step L4 in FIG. 31).

Recognizing the receipt of the ID search request from the peer 3c, the peer 3d searches the metadata column in the ID management area 351d for the metadata satisfying the designated metadata requirements. However, there is no metadata satisfying the requirements in the ID management area 351d in the state (a) shown in FIG. 25. The peer 3d subtracts "1" from the TTL value of the ID search request, and recognizes a TTL value "0" (TTL=0). Accordingly, the peer 3d determines that the number of transfers performed has reached its maximum number, and determines that a further transfer of the ID search request is unnecessary.

Meanwhile, recognizing the receipt of the response from the peer 3c (step L3) in reply to the ID search request, the peer 3b stores the metadata "file type=video, title=ZZ, format=format b" and the ID "10" included in the received response, into the ID management area 351b. As a result, the state of the ID management area 351b of the peer 3b is updated from the state (a) to the state (b) shown in FIG. 25. The peer 3b also transfers the response to the peer 3a as the previous hop in the transfer path of the ID search request (step L5 in FIG. 31).

Recognizing the receipt of the response from the peer 3b (step L5), the peer 3a stores the metadata and the ID included in the response into the ID management area 351a. As a result, the state of the ID management area 351a of the peer 3a is updated from the state (a) to the state (b) shown in FIG. 25. In this manner, the peer 3a recognizes that the ID corresponding to the contents X to be obtained in this operation is "10".

To gather the information on the peer holding the file of the ID "10", the peer 3a next transmits a peer information search request having the ID "10" and the TTL value "3" set therein to the address "Adr(3b)" of the peer 3b in the connected peer management area 355a (step L6 in FIG. 31).

Recognizing the receipt of the peer information search request from the peer 3a, the peer 3b searches the ID column in the peer information management area 352b for the information corresponding to the designated ID "10". Since the peer information management area 352b at this point is in the state (a) shown in FIG. 26, the peer 3b determines that there is not the corresponding ID.

The peer 3b subtracts "1" from the TTL value of the peer information search request, to recognize a TTL value "2" (TTL=2). Since the TTL value here is larger than 0 (TTL>0), the number of transfers performed has not reached the maximum number. Therefore, the peer 3b transfers the peer information search request having the TTL value "2" (TTL=2) to the address of a peer that is not the peer 3a at the previous hop among the addresses registered in the connected peer management area 355b (FIG. 27), or to the address "Adr(3c)" of the peer 3c in order to transfer the peer information search request (step L7 in FIG. 31).

Recognizing the receipt of the peer information search request from the peer 3b, the peer 3c searches the ID column in the peer information management area 352c for the information corresponding to the designated ID "10". Since the peer information management area 352c at this point is in the state (a) shown in FIG. 26, the peer 3c determines that there are no corresponding IDs.

The peer 3c subtracts "1" from the TTL value of the peer information search request, to recognize a TTL value "1" (TTL=1). Since the TTL value here is larger than 0 (TTL>0), the number of transfers performed has not reached the maximum number. Therefore, the peer 3c transfers the peer information search request having the TTL value "1" (TTL=1) to the address of a peer that is not the peer 3b at the previous hop among the addresses registered in the connected peer management area 355c (FIG. 27), or to the address "Adr(3d)" of the peer 3d in order to transfer the peer information search request (step L8 in FIG. 31).

Recognizing the receipt of the peer information search request from the peer 3c, the peer 3d searches the peer information management area 352d for the record of the designated ID "10". Since the peer information management area 352d at this point is in the state (a) shown in FIG. 26, the peer 3d determines that there is the record of the ID "10". The peer 3d then reads out the record, and sends a response including the ID "10" and the address "Adr(3f)" of the peer 3f to the peer 3c as the previous hop in the transfer path of the peer information search request (step L9 in FIG. 31).

The peer 3d subtracts "1" from the TTL value of the peer information search request, and recognizes a TTL value "0" (TTL=0). Accordingly, the peer 3d determines that the number of transfers performed has reached the maximum number, and determines that a further transfer of the peer information search request is unnecessary.

Meanwhile, recognizing the receipt of the response from the peer 3d (step L9) in reply to the peer information search request, the peer 3c stores the ID "10" and the address "Adr (3f)" included in the response, into the peer information management area 352c. As a result, the state of the peer information management area 352c of the peer 3c is updated from the state (a) to the state (b) shown in FIG. 26. The peer 3c also transfers the received response to the peer 3b at the previous hop (step L10 in FIG. 31).

Recognizing the receipt of the response from the peer 3c (step L10), the peer 3b stores the ID "10" and the address "Adr(3f)" included in the response, into the peer information management area 352b. As a result, the state of the peer information management area 352b of the peer 3b is updated from the state (a) to the state (b) shown in FIG. 26. The peer 3b also transfers the received response to the peer 3a at the previous hop (step L11 in FIG. 31).

Recognizing the receipt of the response from the peer 3b (step L11), the peer 3a stores the ID "10" and the address "Adr(3f)" included in the response, into the peer information management area 352a. As a result, the state of the peer information management area 352a of the peer 3a is updated from the state (a) to the state (c) shown in FIG. 26. In this manner, the peer 3a recognizes that the file of the ID "10" exists in the peer 3f.

To request the peer 3f to transmit the file of the contents X, the peer 3a next transmits a file transmission request concerning the ID "10" to the address "Adr(3f)" included in the above peer information (step L12 in FIG. 31).

Recognizing the file transmission request from the peer 3a, the peer 3f retrieves the record of the designated ID "10" from the retained file management area 353f. Since the retained file management area 353f is in the state (a) shown in FIG. 28, the record of the ID "10" is registered. The peer 3f then returns the metadata "file type=video, title=YY, format=format a" read out from the record, and the file A pointed out by the file pointer, as well as the ID "10", to the peer 3a (step L13 in FIG. 31).

Having received the response from the peer 3f, the peer 3a stores the received file A into the file storage area 354a. As a result, the state of the file storage area 354a of the peer 3a is updated from the state (a) to the state (b) shown in FIG. 29. The peer 3a also stores the received ID and the received metadata into a blank row in the ID management area 351a. As a result, the state of the ID management area 351a is updated from the state (b) to the state (c) shown in FIG. 25.

The peer 3a further stores the received ID and the address "Adr(3f)" of the sender of the file into a blank row in the peer information management area 352a. As a result, the state of the peer information management area 352a is updated from the state (a) to the state (c) shown in FIG. 26. The peer 3a also stores the received metadata, the received ID, and the pointer pointing out the file A into a blank row in the retained file management area 353a. As a result, the state of the retained file management area 353a is updated from the state (a) to the state (b) shown in FIG. 28.

By the above operations, the peer 3a, which has designated "file type=video, title=ZZ" as the metadata requirements for the contents X, obtains the file A of the same contents X.

Figure 28:
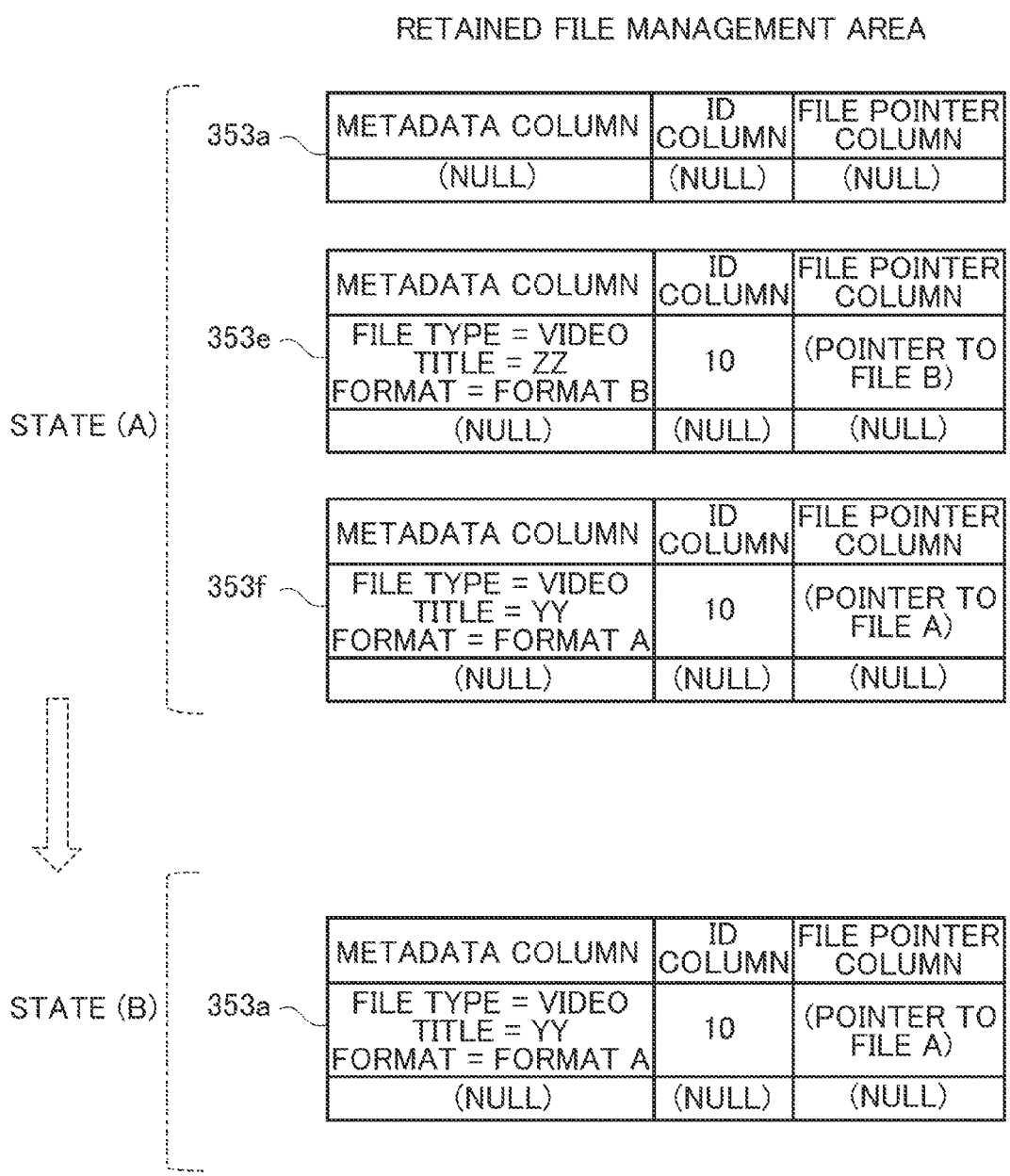
FIG. 28 A diagram shows the data structure of a retained file management area in the specific example of the first embodiment of the present invention.
Figure 29:
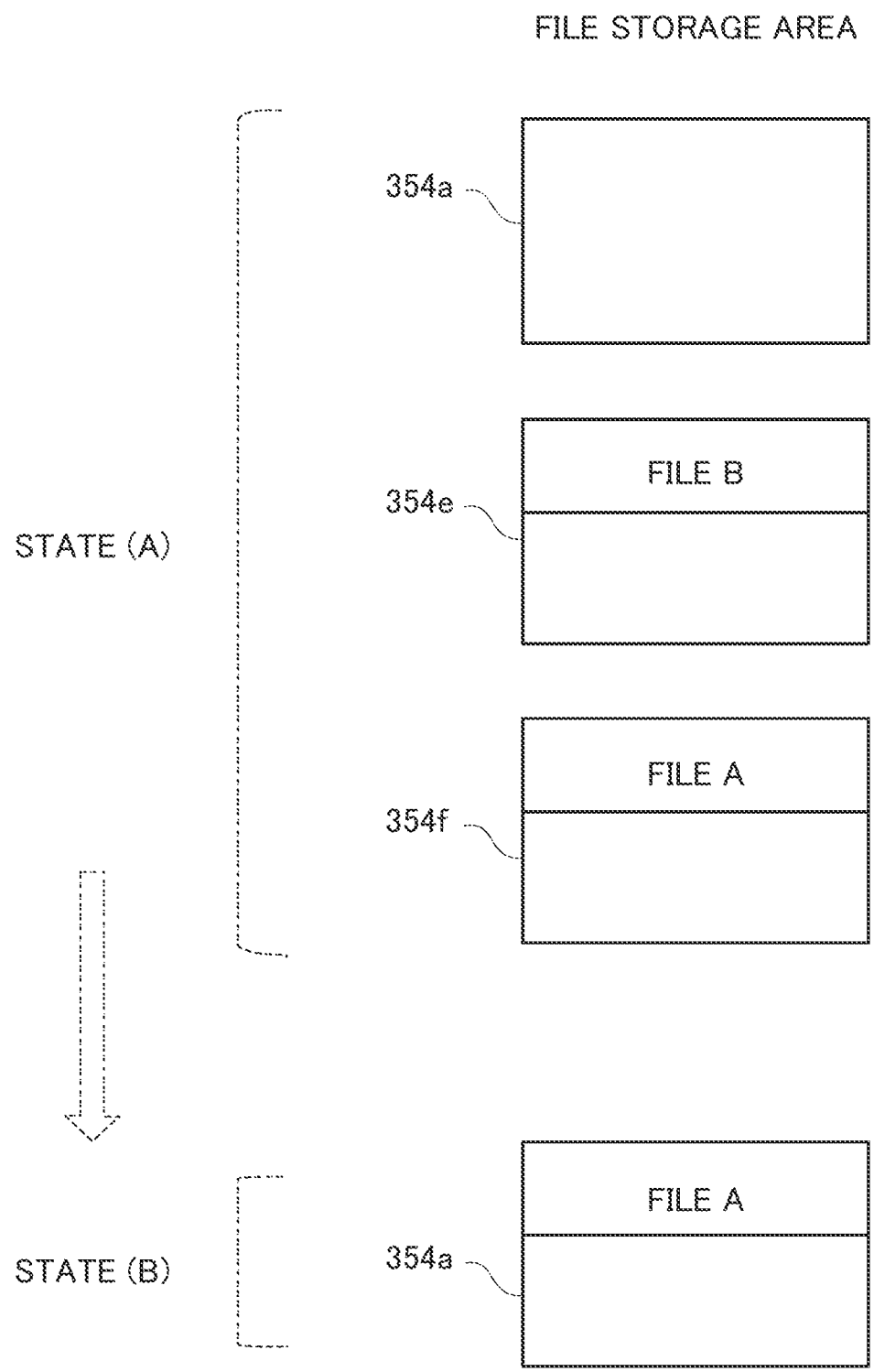
FIG. 29 A diagram shows the data structure of a file storage area in the specific example of the first embodiment of the present invention.

In the above system 100a, the file having the title satisfying the metadata requirements (the file B) exists in the peer 3e (FIG. 28). However, the peer 3a as the contents requester does not have the information on the peer 3e (FIG. 26). Even in such a case, the peer 3a can obtain the file of the same contents X (the file A), while the title is different.

Second Embodiment

A second embodiment of the present invention is now described. This embodiment differs from the first embodiment in that each file is divided before distribution. The system structure and the components of this embodiment are basically the same as those shown in FIGS. 1 through 4. In the following, the different aspects from the first embodiment are described. In this embodiment, a divided piece of a file is referred to as a chunk of the file.

Figure 32:
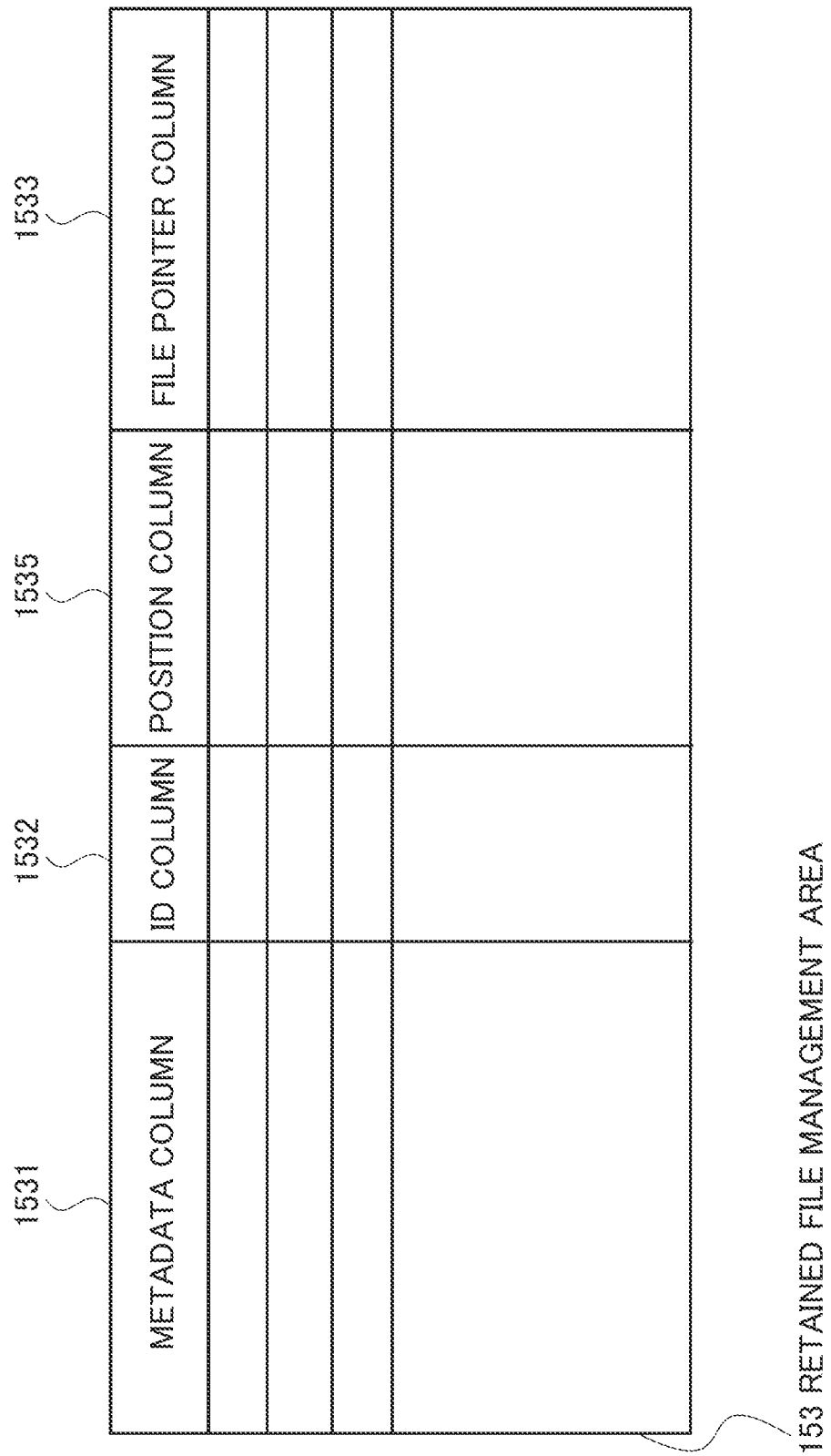
FIG. 32 A diagram shows the data structure of a retained file management area in a second embodiment of the present invention.

FIG. 32 shows the data structure of the retained file management area 153 of each distribution server 1 in accordance with this embodiment. The difference between the data structure shown in FIG. 32 and the data structure of the foregoing embodiment shown in FIG. 5 is the addition of a position column 1535. The data structure shown in FIG. 32 also differs from the data structure of the foregoing embodiment in that chunk pointers as well as entire file pointers are stored in the file pointer column 1533. If there is an entire file pointer in the file pointer column 1533 of a record in the retained file management area 153, the information on the entire file is registered in the position column 1535 of the record. As for each chunk pointer, the position information on the chunk and the information on the entire file are registered.

The position information on a chunk is the information that indicates at which part of the file the chunk is located. The information on an entire file is the information that indicates the total amount of chunks that form the file. For example, in a case where an audio file having a required replay time of 10 minutes is divided by one minute, the position information on the respective chunks is "0 minute", "1 minute", . . . , and "10 minutes", while the entire file information is "10 minutes".

This embodiment also differs from the first embodiment in that not only files but also chunks are stored in the file storage area 154.

Figure 33:
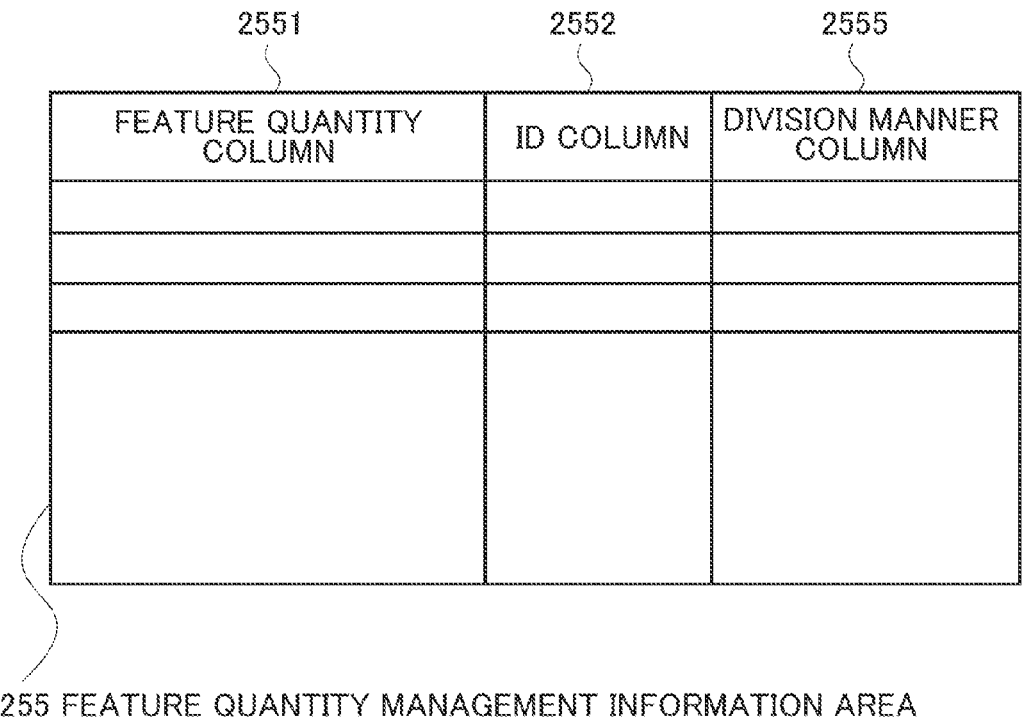
FIG. 33 A diagram shows the data structure of a feature quantity management information area in the second embodiment of the present invention.

FIG. 33 shows the data structure of the feature quantity management information area 255 of the ID management server 2 in accordance with this embodiment. The difference between the data structure shown in FIG. 33 and the data structure of the first embodiment shown in FIG. 6 is the addition of a division manner column 2555. The information on a file division manner is stored in the division manner column 2555. A manner of division involves the criterion for divisions and the size of each divisional unit, and can be determined in accordance of the type of file and the characteristics of the P2P network to be used. For example, in the case of an audio file, the criterion for divisions is the replay time, and each divisional unit may be 10 minutes.

Figure 34:
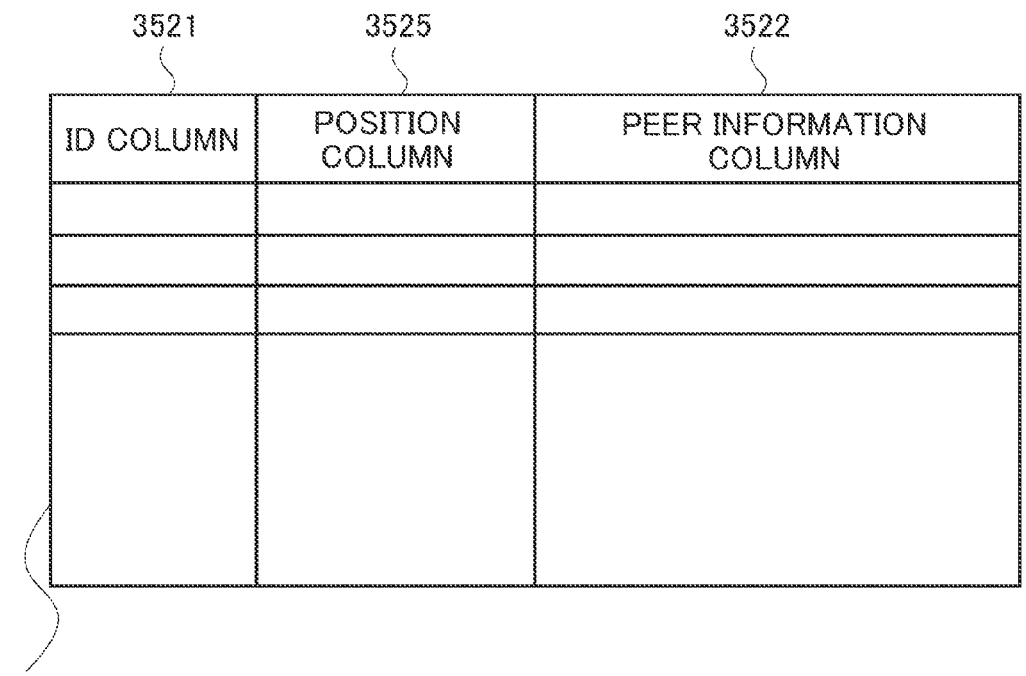
FIG. 34 A diagram shows the data structure of a peer information management area in the second embodiment of the present invention.

FIG. 34 shows the data structure of the peer information management area 352 of each of the peers 3 in accordance with this embodiment. The difference between the data structure shown in FIG. 34 and the data structure of the first embodiment shown in FIG. 8 is the addition of a position column 3525. The chunk position information and the entire file information are stored in the position column 3525.

Figure 35:
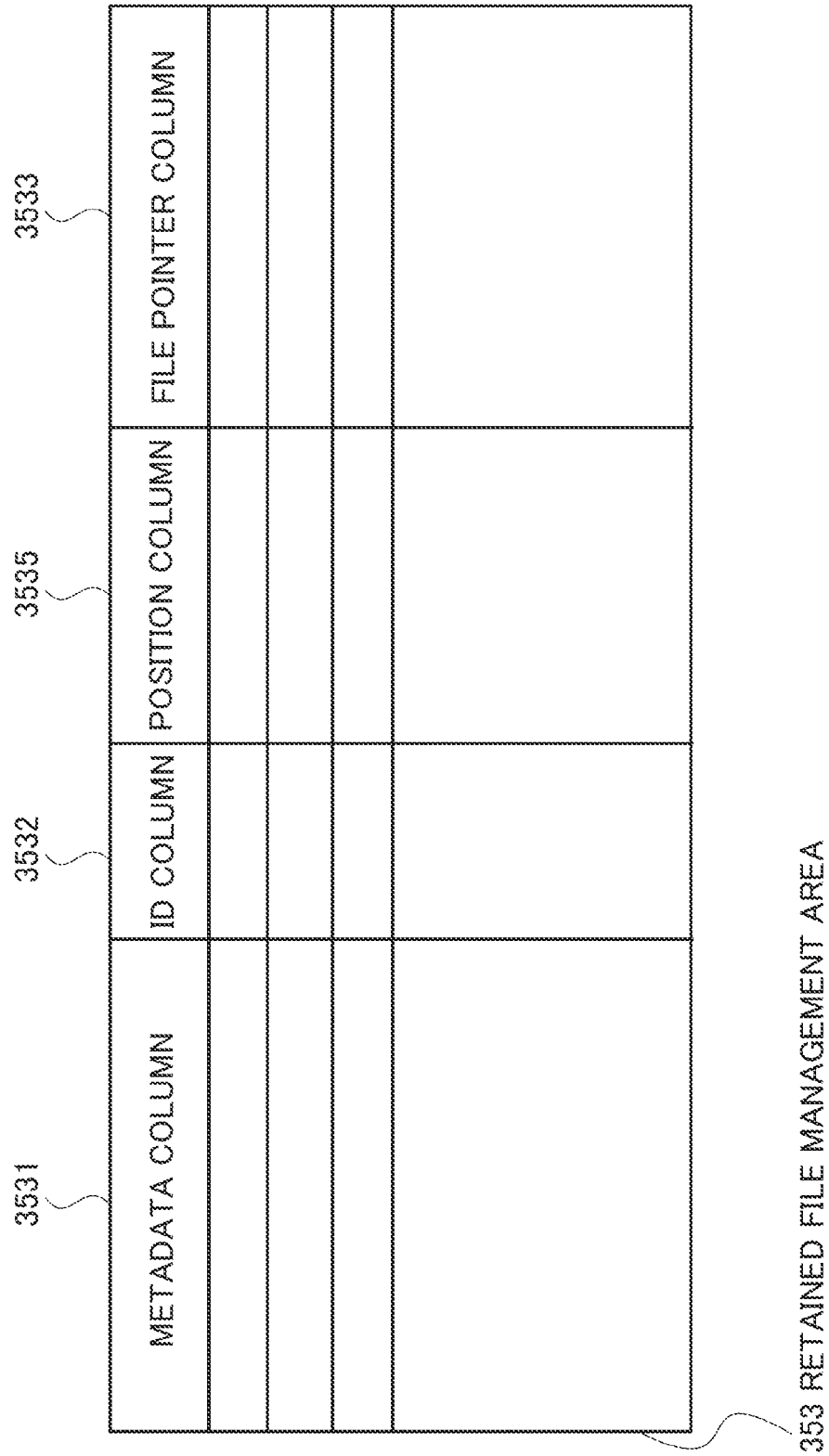
FIG. 35 A diagram shows the data structure of a retained file management area in the second embodiment of the present invention.

FIG. 35 shows the data structure of the retained file management area 353 of each of the peers 3. The difference between the data structure shown in FIG. 35 and the data structure of the first embodiment shown in FIG. 9 is the addition of a position column 3535.

Figure 36:
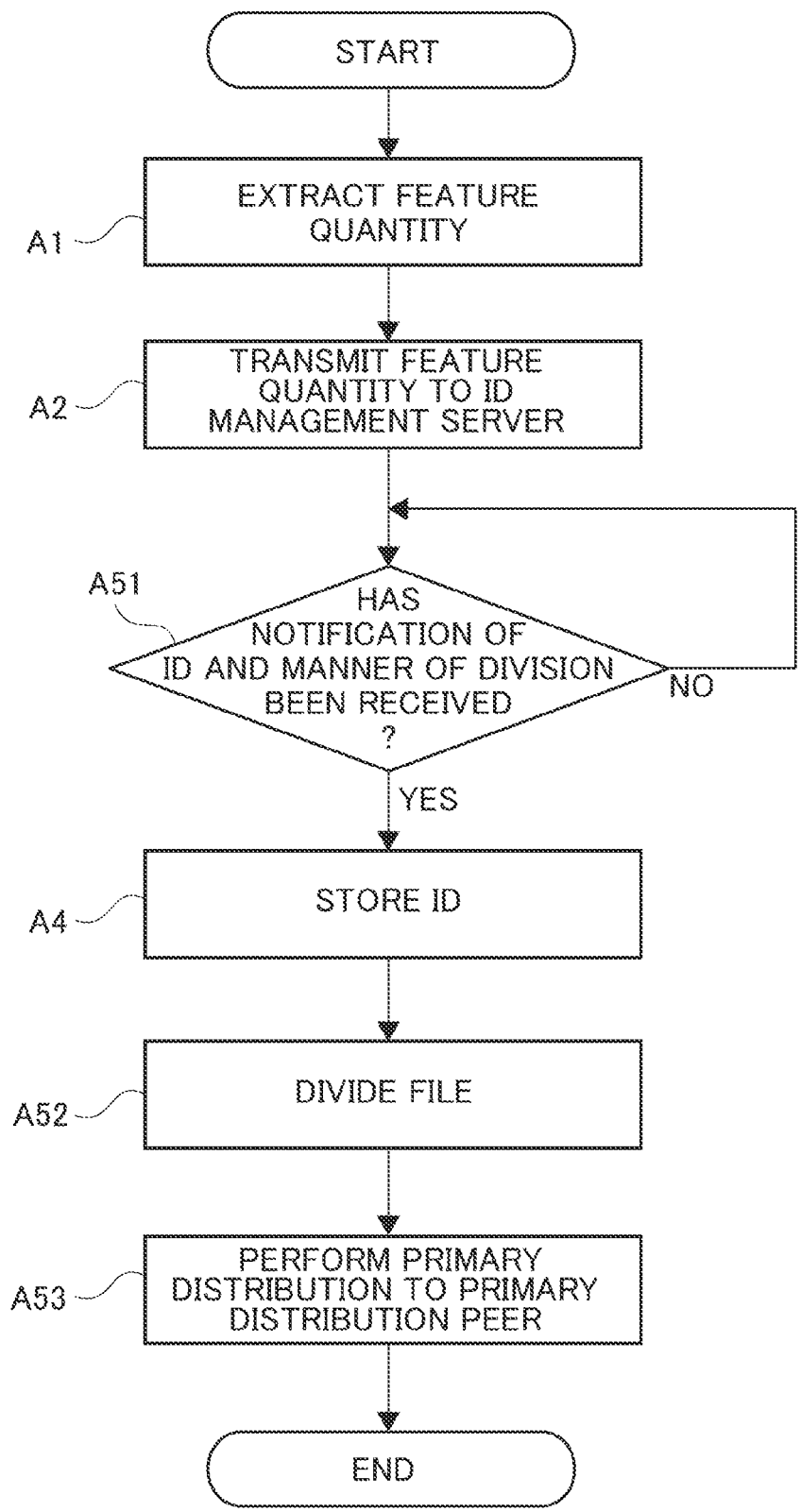
FIG. 36 A flowchart shows the operation of each distribution server in the second embodiment of the present invention.

Referring now to the flowchart shown in FIG. 36, the operation of each of the distribution servers 1 in accordance with this embodiment is described. This operation corresponds to the distribution program 161, and differs from the operation of the first embodiment shown in FIG. 10 in the following aspects. After transmitting the feature quantity of subject contents to the ID management server 2 (step A2), a distribution server 1 of this embodiment stands by until the ID and the information on the manner of division are transmitted (step A51). After storing the ID received from the ID management server 2 (step A4), the distribution server 1 divides the file into chunks in accordance with the information on the manner of division received in step A51 (step A52), and transmits those chunks by a primary distribution (step A53).

Figure 37:
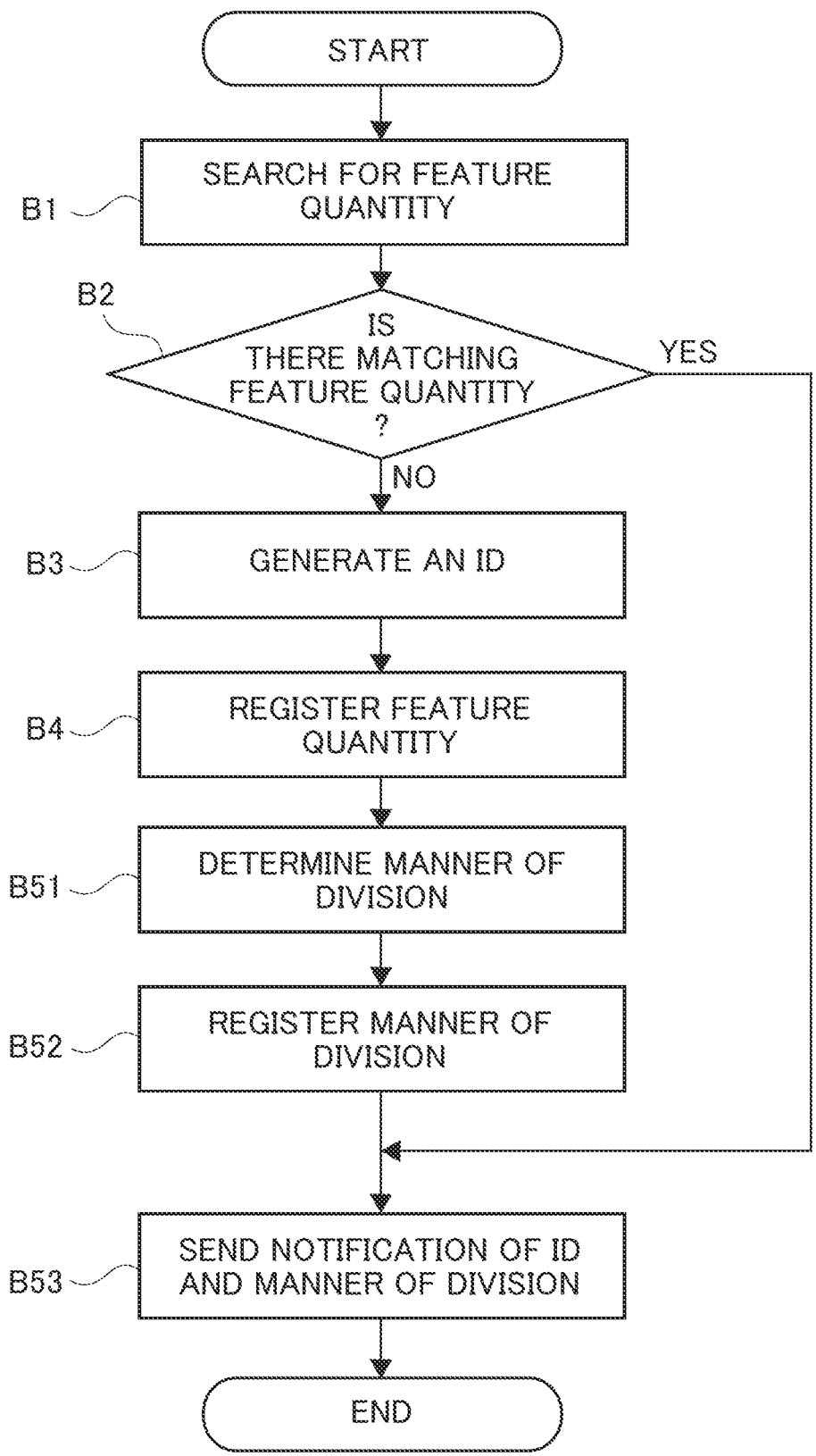
FIG. 37 A flowchart shows the operation of the ID management server in the second embodiment of the present invention.

Referring now to the flowchart shown in FIG. 37, the operation of the ID management server 2 in accordance with this embodiment is described. This operation corresponds to the ID inquiry handling program 262, and differs from the operation of the first embodiment shown in FIG. 11 in the following aspects.

After registering a combination of a newly generated ID and the feature quantity of the contents (steps B3 and B4), the ID management server 2 determines a manner of file division (step B51), and registers the information on the manner of division in the division manner column 2555 of the feature quantity management information area 255 (step B52). Accordingly, the same manner of division is registered with each of the files having the same IDs. The ID management server 2 notifies the distribution server 1 of the manner of division as well as the ID (step B53).

After that, the distribution server divides files in the primary distribution in the manner of division described in the notification from the ID management server 2 (step A52), as described above. The files having the same IDs are divided in the same manner of division.

Figure 38:
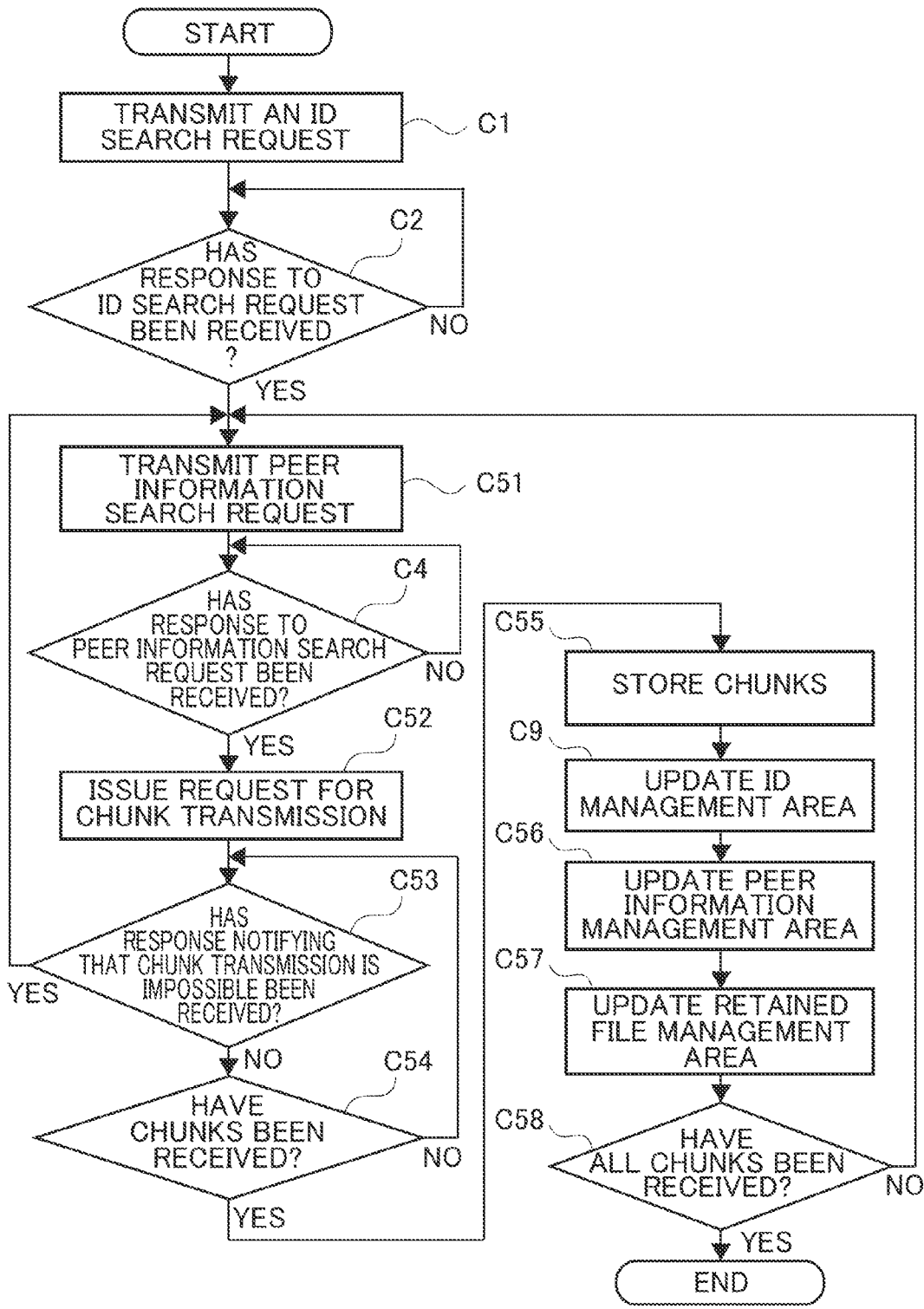
FIG. 38 A flowchart shows an operation of each peer in the second embodiment of the present invention.

Referring now to the flowchart shown in FIG. 38, the operation of each of the peers 3 in accordance with this embodiment is described. This operation corresponds to the request issuance program 363, and differs from the operation of the first embodiment shown in FIG. 12 in the following aspects.

When transmitting a peer information search request equivalent to the peer information search request in step C3 in the first embodiment (step C51), a peer 3 transmits the information on the chunk positions as well as the ID and the TTL value. The chunk positions indicate the positions of the chunks to be obtained by the requester peer 3. If there are no chunks of the requested file, the information on all the chunks may be set. Having received a response to the peer information search request (step C4), the peer 3 transmits a chunk transmission request to the peer indicated in the response (step C52).

If the peer 3 receives a response to the effect that chunk transmission cannot be performed (yes in step C53), the peer 3 restarts from the procedure of step C51, so as to obtain the chunks from another peer. If the peer 3 receives the chunks (yes in step C54), the peer 3 stores the chunks into the file storage area 354 (step C55), and updates the ID management area 351, the peer information management area 352, and the retained file management area 353 (steps C9, C56, and C57).

The peer 3 further determines whether all the chunks of the subject file have been obtained, based on the chunk position information and the entire file information stored in the position column 3535 of the retained file management area 353 (step C58). As a result, if there are chunks yet to be obtained, the peer 3 repeats the procedures of step C51 and steps following step C51, so as to obtain the chunk.

The operations in accordance with the request handling program 364 of each of the peers 3 in this embodiment are the same as the operations of the first embodiment shown in FIGS. 13, 14, and 17. In the following, different operations from those of the first embodiment are described.

Figure 39:
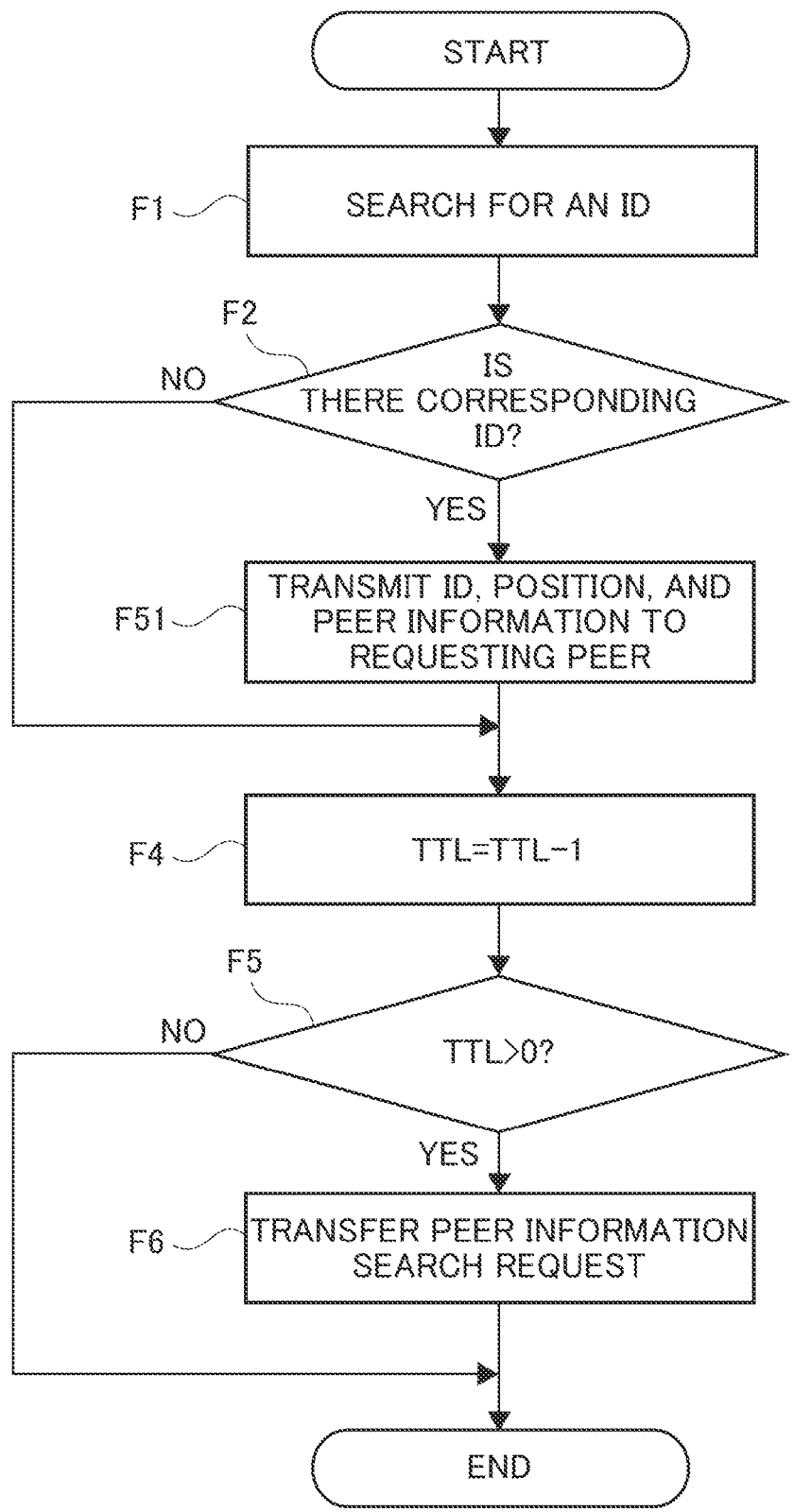
FIG. 39 A flowchart shows an operation of each peer in the second embodiment of the present invention.

FIG. 39 shows the procedures in a peer information search request handling operation (step D3) in accordance with this embodiment. The difference between the operation shown in FIG. 39 and the operation of the first embodiment shown in FIG. 15 is that, if the corresponding ID is detected as a result an ID search (yes in step F2), the chunk position information as well as the ID and the peer information is transmitted to the peer 3 at the previous hop (step F51).

Figure 40:
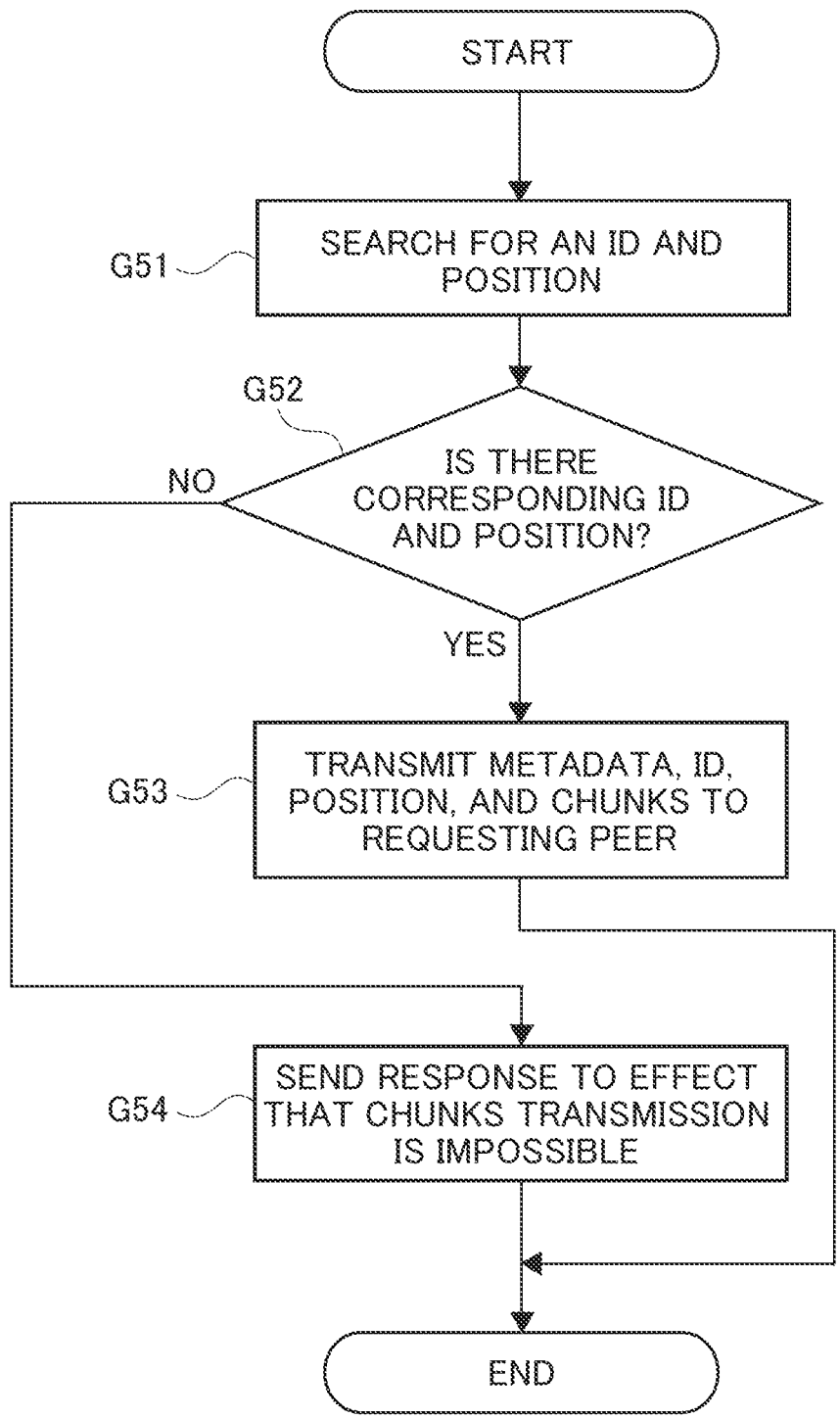
FIG. 40 A flowchart shows an operation of each peer in the second embodiment of the present invention.

FIG. 40 shows the procedures in a file transmission request handling operation (step D4) in accordance with this embodiment. This operation differs from the operation of the first embodiment shown in FIG. 16 in the following aspects. The peer 3 searches the retained file management area 353 for the information corresponding to the ID and the chunk position information received from another peer (step G51).

If a record having the corresponding ID and the corresponding chunk positions is detected as a result of the above search (yes in step G52), the metadata and the ID of the record and the chunk positions, and the chunks in the file storage area 354 indicated by the pointer in the same record are sent as a response to the requesting peer 3 (step G53). If the corresponding ID is not detected as a result of the above search (no in step G52), the peer 3 sends the requesting peer 3 a response to the effect that chunk transmission cannot be performed (step G54).

Figure 41:
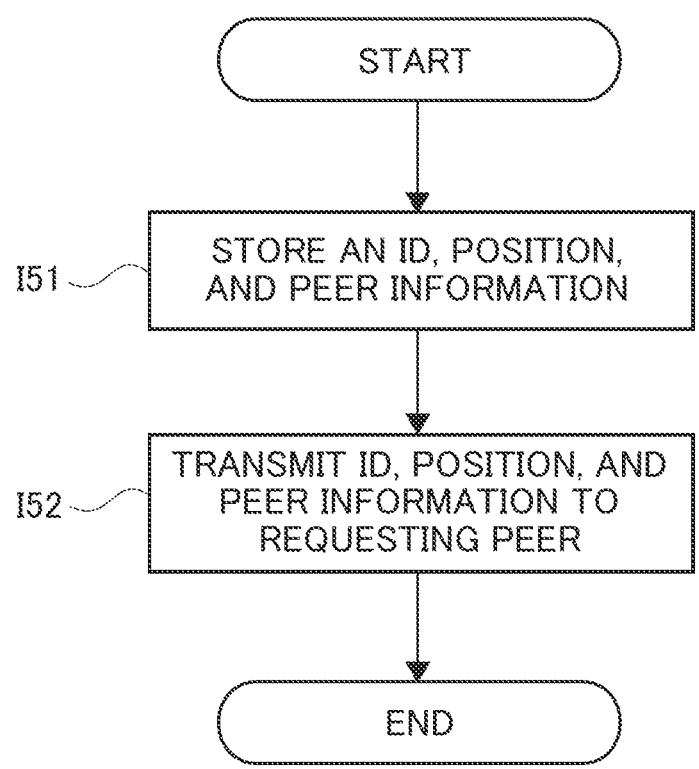
FIG. 41 A flowchart shows an operation of each peer in the second embodiment of the present invention.

FIG. 41 shows the procedures in a peer information search request response handling operation (step D6) in accordance with this embodiment. The operation shown in FIG. 41 differs from the operation of the first embodiment shown in FIG. 18 in the following aspects. The peer 3 stores the ID, the chunk positions, and the peer information sent as a response from another peer, into a blank row in the peer information management area 352 (step I51), and transfers them to the peer at the previous hop (step I52).

Figure 42:
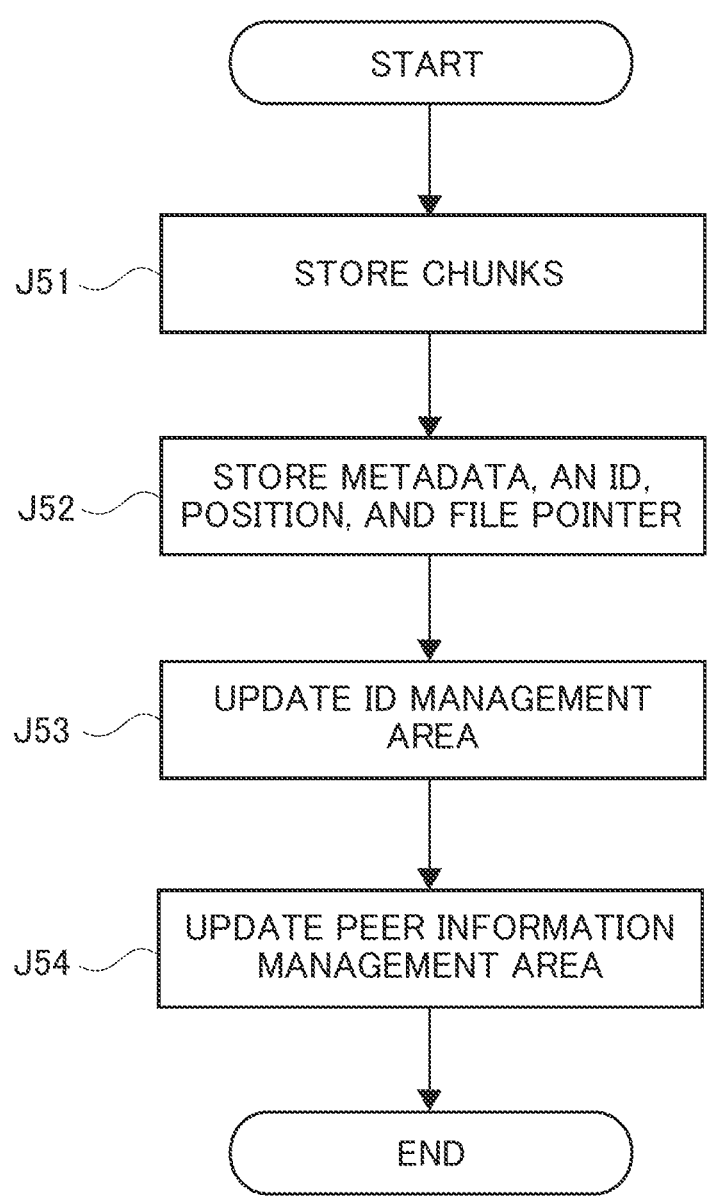
FIG. 42 A flowchart shows an operation of each peer in the second embodiment of the present invention.

FIG. 42 shows the procedures in a primary distribution response handling operation (step D7) in accordance with this embodiment. This operation differs from the operation of the first embodiment shown in FIG. 19 in the following aspects. The peer 3 stores the chunks received from the distribution server 1 by the primary distribution, into the file storage area 354 (step J51). The peer 3 also stores the metadata, the ID, and the chunk positions received together with the chunks into a blank row in the retained file management area 353, and stores the pointer pointing out the file just stored in the file storage area 354 into the file pointer column 3533 of the same row (step J52). The peer 3 further stores the received metadata and the received ID into a blank row in the ID management area 351 (step J53), and stores the received ID, the received positions, and own peer information into a blank row in the peer information management area 352 (step J54).

In accordance with this embodiment, contents can be downloaded by the file chunk. Accordingly, even in a case where downloading by the file from one of the peers 3 is difficult, for example, chunks of the file can be downloaded from other peers. Also, in a case where a series of chunks of a certain file cannot be obtained, the desired contents can be obtained by collecting the chunks having the same ID as the ID of the file. Thus, the possibility that the desired contents is successfully obtained can be made higher.

Specific Example

A specific example of an operation in accordance with this embodiment is now described. In this example, a file A that is a video file of contents X, and a file B that is also a video file of the contents X are to be distributed. The file A and the file B are created in different formats: "format a" and "format b". As for the metadata, "title=YY" is set in the file A, and "title=ZZ" is set in the file B. The time required to replay the contents X is "10 minutes".

When a distribution server 1 starts distributing the file A or the file B, the distribution server 1 first extracts the feature quantity of each file, and transmits the feature quantities to the ID management server 2. Having receiving the feature quantities, the ID management server 2 issues an ID to the feature quantity of each file. Since the file A and the file B are files of the same contents X, the same feature quantities are extracted from both files. Accordingly, the ID management server 2 allots the same IDs to the two files. The ID management server 2 also determines a manner of division of files having the IDs allotted thereto.

The ID management server 2 determines the manner of division for the video files as "dividing each file by five minutes based on the replay time", for example. In such a case, the ID management server 2 stores the feature quantity of the contents X into a record in the feature quantity management information area 255, and stores the manner of division, "criterion: replay time, size: 5 minutes", into the division manner column 2555 in the same record. The ID management server 2 also sends the determined ID and the manner of division, "criterion: replay time, size: 5 minutes", as a response to the distribution server 1.

Having received the response from the ID management server 2, the distribution server 1 divides each of the files A and B by five minutes based on the replay time, and transmits the divided files by primary distribution. Even in a case where the lengths of the files A and B in bytes differ from each other, each of the files is divided into two chunks, because the criterion for division is the replay time. More specifically, the file A is divided into a chunk a (minute 0 to minute 5) and another chunk a (minute 6 to minute 10), and the file B is divided into a chunk b (minute 0 to minute 5) and another chunk b (minute 6 to minute 10).

In the retained file management area 153 of the distribution server 1, "position information=minutes 0-5, entire information=minutes 0-10" or "position information=minutes 6-10, entire information=minutes 0-10" is stored into the position column 1535 of the record corresponding to a chunk of the file A or the file B, depending on the replay time of the chunk.

When the chunks of the file A and the file B are distributed to one of the peers 3, the same information as above is stored into the position column 3525 in the peer information management area 352 and the position column 3535 in the retained file management area 353.

In a case where "title=YY" is designated as the metadata requirement before a file is downloaded by a peer 3, the chunks of the file A and the file B having the same IDs are to be downloaded. For example, the requesting peer 3 has successfully downloaded the chunk a (minute 0 to minute 5), but cannot find a peer having the chunk a (minute 6 to minute 10). Alternatively, the requesting peer 3 has found the peer having the chunk a (minute 6 to minute 10), but cannot communicate with the peer due to communication trouble. Even in such a case, the requesting peer 3 can collect the chunks of the desired contents, if the chunk b (minute 6 to minute 10) can be downloaded from yet another peer.

In a case where the chunk a (minute 0 to minute 5) and the chunk b (minute 6 to minute 10) of different files are downloaded as described above, the peer 3 should select a manner of replay suitable for each of the formats of the period "minute 0 to minute 5" and the period "minute 6 to minute 10" in the replay time. Accordingly, the entire contents X can be viewed.

The present invention is not limited to the embodiments described above. Various modifications may be made to those embodiments within the scope of the present invention. For example, although the distribution servers 1, the ID management server 2, and the peers 3 operate with different sets of hardware from one another in the above described embodiments, they may operate with the same hardware. More specifically, the functions of the distribution servers 1 and the peers 3 are gathered into a node device in the network 9, and the device operates with one CPU, one memory, one data storage unit, and one program storage unit. When an outsider is to obtain contents held by this node device, this node device is regarded as the peer holding the target file, and a request for the file should be issued to the peer from another peer in the network 9.

Although only one ID management server 2 is used in each of the above described embodiments, two or more ID management servers 2 may manage different IDs from each other. For example, it is possible to construct a system in which different ID management servers 2 respond to ID search requests, depending on the bit value of a certain digit in feature quantity data.

The functions of the respective programs (161, 262, 363, and 364) shown in FIGS. 43 through 45 may not be realized as the functions of programs to be executed by the CPU as in the above embodiments, but may be realized by a LSI chip independent of the CPU. For example, a special-purpose LSI chip for realizing the functions may be provided as the distribution part 173 of FIG. 43 in each distribution server 1.

The invention claimed is:
1. A system comprising:
a distribution server;
an ID server; and
a plurality of peers connected to a network, wherein
the distribution server has a unit calculating feature quantities of contents written in a plurality of files by using a common calculation operation and notifying the ID server of the calculated feature quantities, and a unit implementing a primary distribution by transmitting the plurality of files along with their respective IDs to the peers, the feature quantities being fingerprints or electronic watermarks used for uniquely identifying the contents regardless of formats of the files,
the ID server has a unit allotting a common ID to feature quantities which are equivalent to each other among the notified feature quantities from the distribution server and allotting different IDs to feature quantities which are different from each other, and a unit notifying the distribution server of the allotted ID, and each of the plurality of peers has:
- a unit associating the plurality of files with the IDs transmitted by the primary distribution and storing the associated files and IDs;
- a unit gathering, when obtaining the file stored in another peer, information on ID of said file and said another peer though the network, by:
  - a unit transferring a request from another peer related to the gathering of the information;
  - a unit requesting the another peer shown in the gathered information to transmit the file corresponding to the ID shown in said information; and
  - a unit transmitting the stored file to another peer when said file is requested by said another peer.

2. The system according to claim 1, wherein
the ID server determines a common manner of division for files having the common ID allotted thereto, and notifies the distribution server of the determined manner of division,
the distribution server divides each file to be transmitted in the primary distribution into a plurality of chunks in the determined manner of division for said each file, and transmits the chunks by the primary distribution, and
each of the peers: associates the chunks with the ID received by the primary distribution; stores the associated chunks and ID; gathers, when obtaining the chunks stored in another peer, information on ID of said chunks, a position of division and said another peer through the network; requests the another peer to transmit the chunks corresponding to the ID and the position of division shown in the gathered information; and transmits the stored chunks to another peer when said chunks are requested by said another peer.

3. The system according to claim 1, wherein when the ID server allots the ID to the feature quantities transmitted by the distribution server, the ID server: registers the feature quantities along with the allotted ID; compares feature quantities, which is newly notified from the distribution server with the registered feature quantities; allots the same ID as the registered ID to the newly notified feature quantity if both of the compared feature quantities correspond; and allots a new ID to the newly notified feature quantity if both of the compared feature quantities do not correspond.

4. The system according to claim 1, wherein the unit gathering the information in each of the peers: transmits a search request signal set therein a message indicating the request of the information and a maximum number of transferring the search request signal among peers in the network; transfers the search request signal to another peer if the number of transfers of the search request signal received from another peer has not reached the maximum number; responds information indicated by the search request signal from another peer if having said information; records information from another peer as a response to a search request signal; and transfers the recorded information through a backward path of the search request signal.

5. A peer connected to a network comprising:
- a unit associating a plurality of files with IDs transmitted from a server and storing the associated files and IDs, the transmitted IDs having been allocated to the files based on feature quantities, the feature quantities being fingerprints or electronic watermarks used for uniquely identifying the contents regardless of formats of the files, a common ID being allotted to feature quantities which are equivalent to each other and different IDs being allotted to feature quantities which are different from each other;
- a unit gathering, when obtaining a file stored in another peer of the network, information on ID of said file and said another peer through the network, by:
  - a unit transferring a request from another peer related to the gathering of the information;
  - a unit requesting the another peer shown in the gathered information to transmit the file corresponding to the ID shown in said information; and
  - a unit transmitting the stored file to another peer when said file is requested by said another peer.

6. The peer according to claim 5, wherein
the unit associating the plurality of files with IDs, when receiving a file divided into chunks from the server, associates said chunks of the file with ID and stores the associated chunks and ID;
the unit gathering the information gathers, when obtaining chunks stored in another peer, information on ID of said chunks, a position of division and said another peer through the network;
the unit requesting the file requests the another peer to transmit the chunks corresponding to the ID and the position of division shown in the gathered information; and
the unit transmitting the stored file transmits the stored chunks to another peer when said chunks are requested by said another peer.

7. The peer according to claim 5, wherein
the unit gathering the information transmits a search request signal set therein a message indicating the request of the information and a maximum number of transferring the search request signal among peers in the network, and
the unit transmitting the stored file to another peer: transfers a search request signal to another peer if the number of transfers of said search request signal has not reached a maximum number; responds information indicated by the search request signal from another peer if having said information; records information from another peer as a response to a search request signal; and transfers the recorded information through a backward path of the search request signal.

* * * * *